United States Patent
Joshi et al.

(10) Patent No.: US 12,227,296 B2
(45) Date of Patent: Feb. 18, 2025

(54) COOLING SYSTEM FOR AIRCRAFT COMPONENTS

(71) Applicant: Toyota Motor Engineering & Manufacturing North America, Inc., Plano, TX (US)

(72) Inventors: Shailesh N. Joshi, Ann Arbor, MI (US); Danny J. Lohan, Northville, MI (US); Hiroshi Ukegawa, South Lyon, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 435 days.

(21) Appl. No.: 17/708,784

(22) Filed: Mar. 30, 2022

(65) Prior Publication Data
US 2023/0312109 A1    Oct. 5, 2023

(51) Int. Cl.
*B64D 13/00* (2006.01)
*B60L 58/26* (2019.01)
*B64C 29/00* (2006.01)

(52) U.S. Cl.
CPC ............ *B64D 13/006* (2013.01); *B60L 58/26* (2019.02); *B64C 29/0033* (2013.01)

(58) Field of Classification Search
CPC ...... B64D 13/006; B64D 33/08; B64D 27/24; B60L 13/006; B64C 29/0033; B64C 3/58
USPC .......................................................... 454/76
See application file for complete search history.

(56) References Cited

U.S. PATENT DOCUMENTS

| | | |
|---|---|---|
| 4,674,704 A | 6/1987 | Altoz et al. |
| 7,325,772 B1 | 2/2008 | Hanewinkel, III et al. |
| 9,714,090 B2 | 7/2017 | Frolov et al. |
| 10,823,066 B2 | 11/2020 | Miller et al. |
| 11,148,827 B2 | 10/2021 | Blanding |
| 11,371,491 B1* | 6/2022 | Steadele ............. F03G 7/06146 |
| 2006/0163425 A1* | 7/2006 | Brown .................. B64D 41/00 244/53 B |
| 2007/0193277 A1* | 8/2007 | Sheoran ................. F02C 7/057 60/802 |
| 2010/0071881 A1 | 3/2010 | Murer et al. |
| 2018/0334251 A1 | 11/2018 | Karem et al. |
| 2019/0270517 A1 | 9/2019 | Morgan |

(Continued)

OTHER PUBLICATIONS

Celsia, "Vapor Chamber", Retrieved from the Internet: <https://celsiainc.com/technology/vapor-chamber/#:~:text=A%20vapor%20chamber%2C%20sometimes%20called%20a%20planar%20heat,local%20as%20opposed%20to%20a%20remote%20heat%20sink>, Retrieved Mar. 28, 2022, 11 pages.

*Primary Examiner* — Steven B McAllister
*Assistant Examiner* — Charles R Brawner
(74) *Attorney, Agent, or Firm* — Christopher G. Darrow; Darrow Mustafa PC

(57) ABSTRACT

A louvre system controls a flow of cooling air to a heat-generating element mounting inside a wing of an aircraft. The louvre system includes a louvre operably connected to the wing and structured to be rotatable to control airflow through an air intake of the wing into an interior of the wing. A louvre actuation mechanism is operably connected to the louvre and configured to control rotation of the louvre. A memory is communicably coupled to a processor and stores a louvre control module configured to autonomously control operation of the louvre actuation mechanism to control rotation of the louvre responsive to a temperature of a heat-generating element mounted in the wing interior.

18 Claims, 12 Drawing Sheets

(56) References Cited

U.S. PATENT DOCUMENTS

| | | | |
|---|---|---|---|
| 2021/0391627 A1* | 12/2021 | Villanueva | H01M 10/625 |
| 2022/0297823 A1* | 9/2022 | Uehara | B64C 21/08 |
| 2023/0382547 A1* | 11/2023 | Lohe | B64D 27/357 |

* cited by examiner

COOLING SYSTEM FOR AIRCRAFT COMPONENTS

TECHNICAL FIELD

The embodiments disclosed herein relate to cooling systems for vehicle components and, more particularly, to a louvre system mountable to a hollow wing structure of an aircraft for cooling aircraft components mounted inside the wing.

BACKGROUND

Electrical vertical take-off and landing (eVTOL) vehicles are electric vehicles that transport passengers by flying. Similar to helicopters, they take-off and land vertically. It is expected that gas-powered VTOLs and eVTOLs will become popular methods of transportation in the future. To conserve space and reduce weight in such vehicles, the wings of the aircraft may be hollow and structured to accommodate batteries for powering the aircraft and power electronics for controlling aircraft components and operations. However, the batteries and power electronics generate significant heat, particularly during take-off, landing and during times of acceleration. Heat from these heat-generating elements must be removed to keep the components operating below their maximum operating temperatures. Various methods of cooling heat-generating elements may include passing gases or liquids over surfaces of these components to remove heat therefrom. The use of a liquid cooling medium adds undesirable weight to the aircraft and introduces the problem of potential leakage of the cooling medium. When using gaseous cooling media such as ambient air, it is desirable to ensure a flow of cooling air into the wing interior when the aircraft is not moving. It is also desirable to direct the flow of cooling air over as many external surfaces of the heat-generating element(s) as possible, to ensure efficient cooling and avoid localized hotspots in the components.

SUMMARY

In one aspect of the embodiments described herein, a louvre system is provided for controlling a flow of cooling air to a heat-generating element mounting inside a wing of an aircraft. The louvre system includes a louvre operably connected to the wing and structured to be rotatable to control airflow through an air intake of the wing into an interior of the wing. A louvre actuation mechanism is operably connected to the louvre and configured to control rotation of the louvre. A memory is communicably coupled to a processor and stores a louvre control module including computer-readable instructions that when executed by the processor cause the processor to autonomously control operation of the louvre actuation mechanism to control rotation of the louvre responsive to a temperature of a heat-generating element mounted in the wing interior.

In another aspect of the embodiments described herein, a method is provided for controlling rotation of a louvre operably connected to a wing. The louvre is structured to cover an opening enabling fluid communication between an exterior of the wing and an interior of the wing. The method includes a step of autonomously controlling rotation of the louvre responsive to a temperature of a heat-generating element mounted in the wing interior.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

A louvre system controls a flow of cooling air to a heat-generating element mounting inside a wing of an aircraft. The louvre system includes a louvre operably connected to the wing and structured to be rotatable to control airflow through an air intake of the wing into an interior of the wing. A louvre actuation mechanism is operably connected to the louvre and configured to control rotation of the louvre. A memory is communicably coupled to a processor and stores a louvre control module configured to autonomously control operation of the louvre actuation mechanism to control rotation of the louvre responsive to a temperature of a heat-generating element mounted in the wing interior. The louvre control module may also be configured to control rotation of the louvre responsive to a rotational orientation of an aircraft engine nacelle having a propeller wash zone in which the louvre is located.

Figure 1:
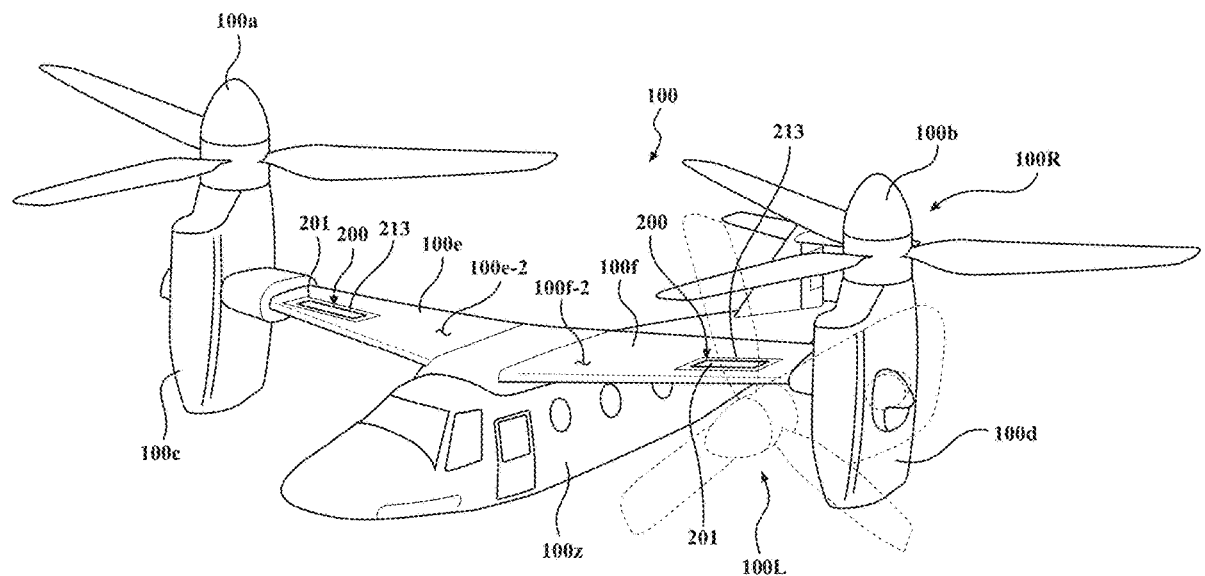
FIG. 1 is a schematic perspective view of a VTOL (vertical take-off and landing) aircraft incorporating a louvre system in accordance with embodiments described herein.
Figure 2:
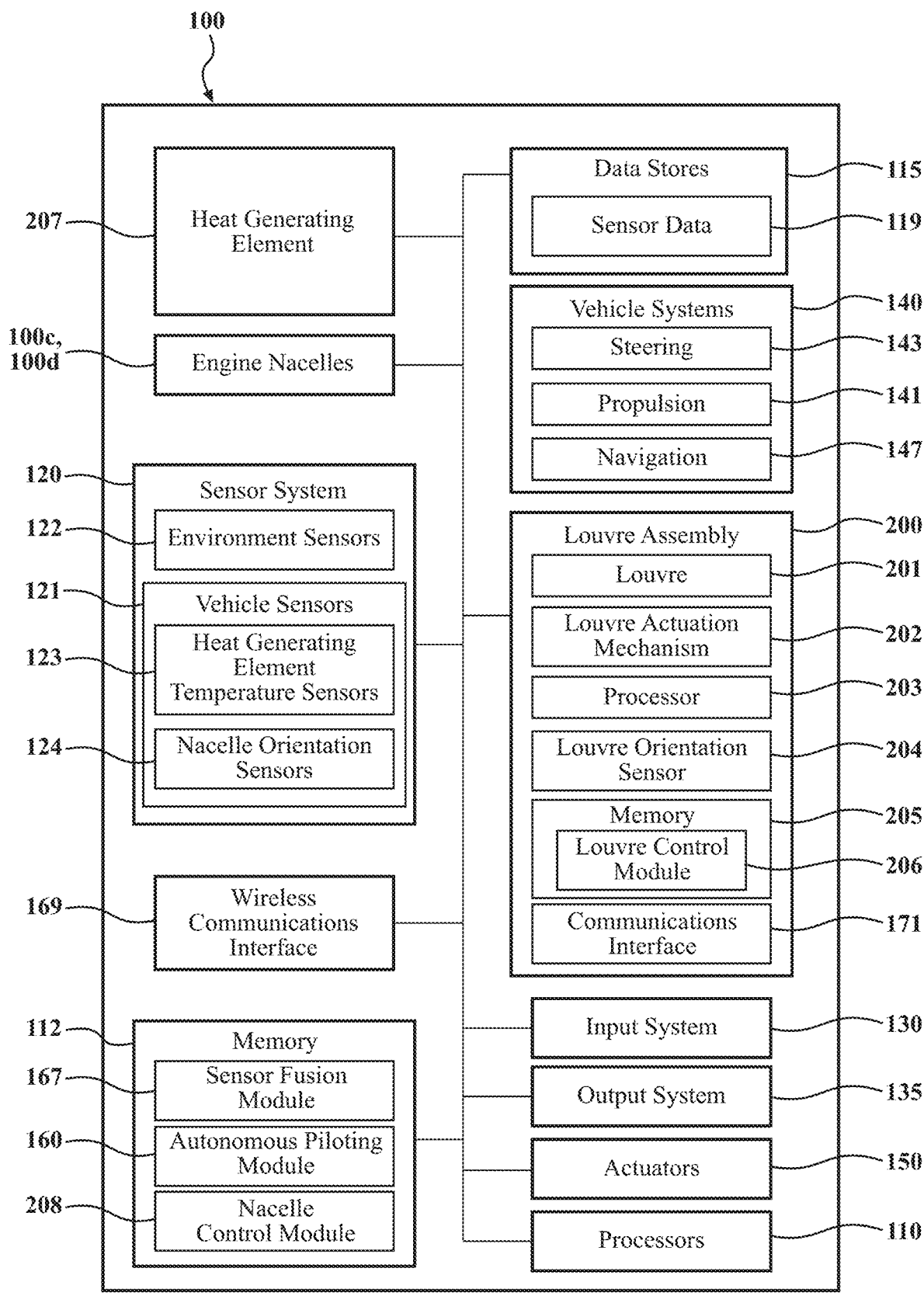
FIG. 2 is a block schematic diagram showing various components of an example of a VTOL aircraft as shown in FIG. 1.

Referring to FIGS. 1 and 2, an example of a vehicle 100 is illustrated. As used herein, a "vehicle" includes any form of motorized transport. In one or more implementations, the vehicle 100 is a VTOL (vertical take-off and landing) aircraft. The aircraft 100 may be piloted by a human pilot or the aircraft may be an autonomously-operable drone or UAV (unmanned aerial vehicle). While detailed arrangements will be described herein with respect to a vehicle in the form of a VTOL aircraft, it will be understood that embodiments are not limited to this form of vehicle. In some implementations, the aircraft 100 may be any form of motorized transport that benefits from the functionality discussed herein.

The aircraft 100 also includes various elements. It will be understood that in various embodiments it may not be necessary for the aircraft 100 to have all of the elements shown in FIG. 2. The aircraft 100 can have any combination of the various elements shown in FIG. 2. Further, the aircraft 100 can have additional elements to those shown in FIG. 2. In some arrangements, the aircraft 100 may be implemented without one or more of the elements shown in FIG. 2. While the various elements are shown as being located within the aircraft 100 in FIG. 2, it will be understood that one or more of these elements can be located external to the aircraft 100.

Some of the possible elements of the aircraft 100 are shown in FIG. 2 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 2 shows a block schematic diagram of the aircraft 100, which incorporates one or more louvres 201 (described in greater detail below) and associated battery/electronic cooling arrangements in accordance with embodiments described herein. In some instances, the aircraft 100 may be configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the aircraft 100 can be a conventional vehicle that is configured to operate in only a manual mode.

In one or more embodiments, the aircraft 100 is an autonomous vehicle. As used herein, "autonomous vehicle" refers to a vehicle that can operate in an autonomous mode. "Autonomous mode" refers to take-off, landing, navigation and/or maneuvering of the aircraft 100 along a projected path of the aircraft using one or more computing systems to control the aircraft 100 with minimal or no input from a human driver or pilot. In one or more embodiments, the aircraft 100 is highly automated or completely automated. In one or more arrangements, the aircraft 100 is configured with one or more semi-autonomous operational modes in which one or more computing systems perform a portion of the navigation and/or maneuvering of the aircraft along a projected path, and a human operator (i.e., pilot) provides inputs to the vehicle to perform a portion of the navigation and/or maneuvering of the aircraft 100 along the projected path.

In FIGS. 1 and 2, the aircraft 100 is configured for VTOL operations, using a tilt-rotor design (i.e., a "tiltrotor"). As is known in the pertinent art, a tiltrotor is an aircraft which generates lift and forward propulsion by using one or more powered rotors 100a, 100b mounted on rotating shafts incorporated into respective engine nacelles 100c, 100d which may be mounted at the ends of respective fixed wings 100e, 100f extending from a fuselage 100z of the aircraft 100. Wings 100e, 100f may have conventional airfoil shapes for providing lift in a conventional manner responsive to forward motion of the aircraft and the resulting flow of air along the wing exterior surfaces. The tiltrotor aircraft 100 may combine the VTOL capability of a helicopter with the speed and range of a conventional fixed-wing aircraft. For takeoffs, hovering over a fixed position, and landings, each of the rotors 100a, 100b may be rotated to a "raised" orientation (shown as orientation 100R in FIG. 1) so that the plane of rotor rotation is horizontal. In this configuration, lift may be generated in the same manner as with a normal helicopter rotor. As the aircraft gains forward speed, the rotors 100a, 100b may be progressively tilted forward to a lowered orientation (shown as orientation 100L in FIG. 1), with the plane of rotor rotation becoming vertical. In this mode the rotors 100a, 100b may provide forward thrust as conventional propellers, with the airfoils of the fixed wings 100e, 100f providing the lift via the forward motion of the entire aircraft 100.

Figure 3:
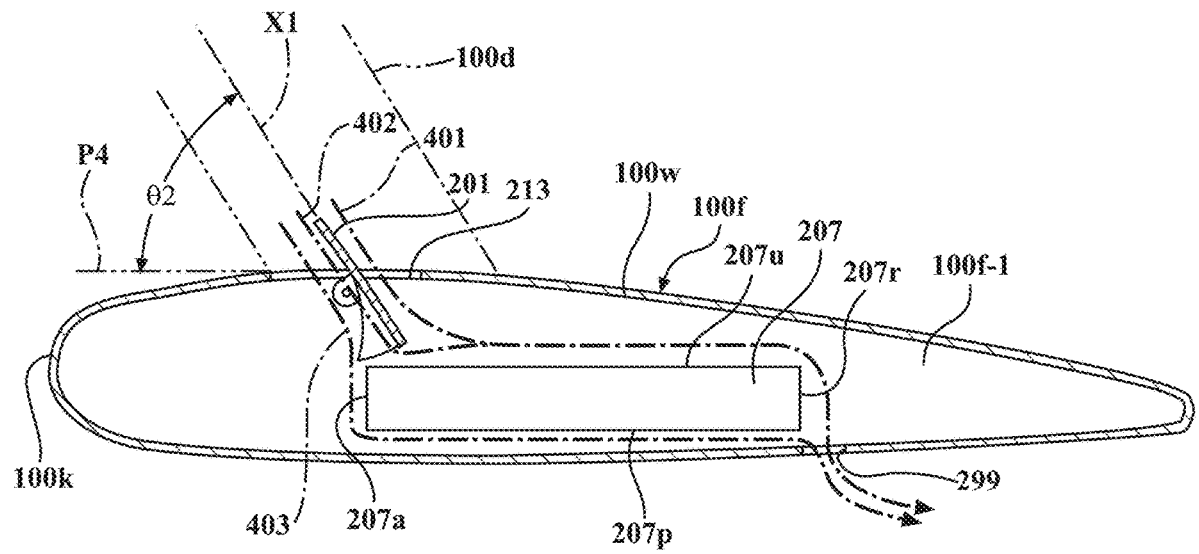
FIG. 3 is a schematic cross-sectional view of an exemplary wing incorporated into the aircraft shown in FIG. 1.

The following descriptions of wing 100f and any elements attached to or incorporated into wing 100f may also apply to wing 100e. FIG. 3 is a schematic cross-sectional view of an exemplary wing (in this case, wing 100f) incorporated into the aircraft 100. At least a portion of the wing 100f may be hollow and define an interior 100f-1 structured for mounting therein various elements of the aircraft 100. The wing 100f may have a thermally conductive outer wall 100w structured to facilitate rapid and efficient transfer of heat from the wing interior 100f-1 to an exterior of the wing. To this end, the wing outer wall 100w may be formed from aluminum or any other material (or combination of materials) having a relatively high thermal conductivity.

In one or more arrangements, the hollow interior 100f-1 of the wing 100f may have a heat-generating element 207 mounted therein. In particular arrangements, the heat-generating element 207 may be a battery module providing power to the aircraft engines and other parts of the aircraft. In some arrangements, the heat-generating element 207 may be a power electronics module of the aircraft. If the heat-generating element 207 is a battery module, the battery module may be electrically coupled to one or more of engine nacelle(s) 100c, 100d and may be configured for powering the aircraft engines for operations such as idling, takeoff, hovering, forward flight, and landing.

As seen in FIG. 3, the heat-generating element 207 may be mounted in the wing interior 100f-1 (using a suitable frame or lattice mounting structure)(not shown) so that the heat-generating element 207 is spaced apart from the interior surfaces of the wing. This arrangement may provide airflow passages 401-403 along exterior surfaces of the heat-generating element 207 to enable air flowing along these surfaces to cool the heat-generating element 207. For example, as seen in FIG. 3, an airflow passage 401 may be provided extending along an upper surface 207*u* and a rear surface 207*r* of the element 207, and an airflow passage 403 may be provided along a front surface 207*a* and an underside 20'7*p* of the element 207. These airflow passages may lead to one or more air outlet(s) 299 formed along a rear, lower surface of the wing 100*f*.

As seen in FIGS. 1 and 3, in one or more arrangements, the one or more cooling air intake(s) 213 may be formed in upper surfaces 100*e*-2, 100*f*-2 of the wings 100*e*, 100*f*, and cooling air outlets 299 may be formed in lower or bottom surfaces of the wing. The intake opening(s) 213 and outlet(s) 299 may be positioned so that air entering the intake(s) 213 is drawn over the various outer surfaces of the heat-generating element 207 toward the outlet(s) 299, to facilitate cooling of the heat-generating element 207. The heat-generating element mounting structure may also be configured to secure the heat-generating element 207 in alignment with one or more cooling air intake opening(s) 213 and outlet(s) 299 formed in the wing 100*f*, so that cooling air entering the air intake opening(s) 213 and passing over the heat-generating element 207 may be directed out of the wing interior after cooling the heat-generating element 207. The air intake opening(s) 213 and outlet(s) 299 may have any desired dimensions to enable a sufficient flowrate of air according to estimated cooling needs, structural considerations of the wing, and other factors.

Referring to FIG. 2, the aircraft 100 can include one or more processors 110. In one or more arrangements, the processor(s) 110 can be a main processor(s) of the aircraft 100. For instance, the processor(s) 110 can be an electronic control unit (ECU). The aircraft 100 can also include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

The one or more data store(s) 115 can include sensor data 119. In this context, "sensor data" means any information about the sensors that the aircraft 100 is equipped with, including the capabilities and other information about such sensors. As will be explained below, the aircraft 100 can include the sensor system 120. The sensor data 119 can relate to one or more sensors of the sensor system 120. As an example, in one or more arrangements, the sensor data 119 can include information on one or more nacelle orientation sensors 124 and heat-generating element temperature sensors 123 of the sensor system 120.

As noted above, the aircraft 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process. In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or other element(s) of the aircraft 100 (including any of the elements shown in FIG. 2).

The sensor system 120 can include any suitable type of sensor. Various examples of different types of sensors are described herein. However, it will be understood that the embodiments are not limited to the particular sensors described and that, for purposes of operating the vehicle, sensors other than those shown in FIG. 2 may be incorporated into the aircraft. The example sensors may be part of the one or more environment sensors 122 and/or the one or more vehicle sensors 121.—The sensor system 120 may include any sensors suitable for and/or required to perform any of the data acquisition and/or vehicle control operations contemplated herein. Sensors of sensor system 120 may be communicably coupled to the various systems and components of the aircraft 100. For example, the sensors may be operably connected to data stores 115 and processor(s) 110, for storage and processing of vehicle and environment sensor data.

The sensor system 120 can include one or more vehicle sensors 121. The vehicle sensor(s) 121 can detect, determine, and/or sense information about the aircraft 100 itself and/or any occupants inside the aircraft. The vehicle sensor(s) 121 may include sensors configured to detect conditions and/or events inside the aircraft interior or occupant compartment. In one or more arrangements, the vehicle sensor(s) 121 can be configured to detect, and/or sense position and orientation changes of the aircraft 100, such as, for example, based on inertial acceleration. In one or more arrangements, the vehicle sensor(s) 121 can include one or more accelerometers (not shown), one or more gyroscopes (not shown), an inertial measurement unit (IMU) (not shown), a global navigation satellite system (GNSS) (not shown), a global positioning system (GPS) (not shown), and/or other suitable sensors. The vehicle sensor(s) 121 can be configured to detect, and/or sense one or more characteristics of the aircraft 100, such as the current geographical location of the aircraft and a speed and acceleration/deceleration of the aircraft 100. The vehicle sensor(s) 121 may include vehicle directional sensors (not shown) configured to determine a current heading of the aircraft and/or direction in which the aircraft is pointed. The vehicle sensor(s) 121 may include sensors configured to sense aspects of the aircraft mechanical and electrical components and/or systems, to aid in determining a mechanical condition of the aircraft and existing and/or potential problems with the aircraft.

In one or more arrangements, the sensor system 120 may include a nacelle orientation sensor 124 configured to determine a rotational orientation or orientation angle of each engine nacelle with respect to some reference parameter. Data from the nacelle orientation sensor(s) 124 may be processed to control the orientations of the engine nacelles 100*c*, 100*d* during takeoff and during the transition from a vertical lift operation to forward flight, for example. As described herein, this nacelle orientation sensor data may also be used to control the louvre orientation angle θ1 for a given nacelle orientation. In one example, as shown in FIG. 3, for purposes of louvre control, the nacelle orientation angle θ2 may be measured between a rotational axis X1 of the propeller and the same reference plane P4 used to determine or estimate the louvre orientation angle θ1.

in cases where the nacelle orientation angle θ2 is determined with respect to a reference parameter other than the reference plane P4 used to determine or estimate the louvre orientation θ1, a correlation between a nacelle orientation angle reference plane and the louvre orientation angle reference plane P4 may be determined for a given wing design and louvre assembly. This correlation may be used to convert a measured value of the nacelle orientation angle to a corresponding louvre orientation value for purposes of control.

Referring again to FIG. 2, the sensor system 120 may also include at least one temperature sensor 123 associated with each heat generating element 207 incorporated into the wings 100e, 100f for measuring the temperatures of the heat generating elements 207. Louvres 201 may be controlled based on data from the temperature sensors 123, to assist in guiding cooling air into the wings and over the exterior surfaces of the heat generating elements 207.

The sensor system 120 can include one or more environment sensors 122 configured to acquire data of at least a portion of the external environment of the aircraft 100. The environment sensors 122 may detect data or information about the external environment in which the vehicle is located or one or more portions thereof. For example, the one or more environment sensors 122 can be configured to detect, quantify and/or sense objects in at least a portion of the external environment of the aircraft 100 and/or information/data about such objects. Such objects may be stationary objects and/or dynamic objects. The one or more environment sensors 122 can be configured to detect, measure, quantify, classify and/or sense other things in the external environment of the aircraft 100. As an example, in one or more arrangements, the environment sensors 122 can include one or more radar sensors (not shown), one or more LIDAR sensors (not shown), one or more cameras (not shown), one or more ultrasonic sensors (not shown), and/or sonar sensors (not shown).

Referring again to FIG. 2, a sensor fusion module 167 may be an algorithm (or a computing device storing an algorithm) configured to accept data from the sensor system 120 as an input. The data may include, for example, data representing information sensed at the sensors of the sensor system 120. The sensor fusion algorithm 167 may include or be configured to be executed using, for instance, a Kalman filter, Bayesian network, or other algorithm. The sensor fusion algorithm 167 may provide various assessments based on the data from sensor system 120. Depending upon the embodiment, the assessments may include evaluations of individual objects and/or features in the environment of aircraft 100, evaluations of particular situations, and/or evaluations of possible impacts based on the particular situation. Other assessments are possible.

A wireless communications interface 169 may be configured to enable and/or facilitate communication between the components and systems of the aircraft and entities (such as cloud facilities, cellular and other mobile communications devices, other aircraft, remote servers, edge devices, etc.) exterior of the vehicle. Wireless communications interface 169 may be configured to facilitate, establish, maintain, and end wireless V2V and V2X communications between elements and/or systems of the vehicle 100 and/or with any extra-vehicular entity. Information such as sensor data, weather information, navigational and map information and other types of information may be transmitted and received via the communications interface 169. If required, wireless communications interface 169 may incorporate or be in communication with any network interfaces needed to communicate with any extra-vehicular entities and/or networks.

The aircraft 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle occupant (e.g., a driver/pilot or a passenger) or a user located remotely from the aircraft 100. The aircraft 100 can also include an output system 135. An "output system" includes any device, component, or arrangement or groups thereof that enable information/data to be presented to an aircraft occupant (e.g., a pilot, a passenger, etc.) or a remote user.

The aircraft 100 can include one or more vehicle systems, collectively designated 140. The aircraft 100 can include more, fewer, or different vehicle systems other than the exemplary systems mentioned herein. Each or any of the vehicle systems or portions thereof may be otherwise combined or segregated via hardware and/or software within the aircraft 100. As examples, the vehicle systems 140 can include a propulsion system 141, a steering system 143, and/or a navigation system 147. Each of these systems can include one or more devices, components, and/or a combination thereof, now known or later developed. The vehicle systems 140 may be communicatively coupled to (and operable under the control of) vehicle modules such as the autonomous piloting module 160 for autonomous operation of the vehicle.

The navigation system 147 can include one or more devices, applications, and/or combinations thereof, now known or later developed, configured to determine the geographic location of the aircraft 100 and/or to determine a projected flight path for the aircraft 100. The navigation system 147 can include one or more mapping applications to determine a projected flight path for the aircraft 100. The navigation system 147 can include a global positioning system, a local positioning system or a geolocation system. The navigation system 147 may be configured to track the path of a vehicle along a projected path. The navigation system 147 may be configured to operate in conjunction with the autonomous piloting module 160 to guide the vehicle along a projected path selected by a user.

The aircraft 100 can include one or more actuators 150. The actuators 150 can be any element or combination of elements operable to modify, adjust and/or alter one or more of the vehicle systems 140 or components thereof to responsive to receiving signals or other inputs from the processor(s) 110, any of the modules stored in memory 112, and/or any other vehicle components or systems. Any suitable actuator can be used. For instance, the one or more actuators 150 can include motors, pneumatic actuators, hydraulic pistons, relays, solenoids, and/or piezoelectric actuators, just to name a few possibilities. One or more of actuators 150 may be configured to control the orientation angles of the engine nacelles 100c, 100d.

Figure 5:
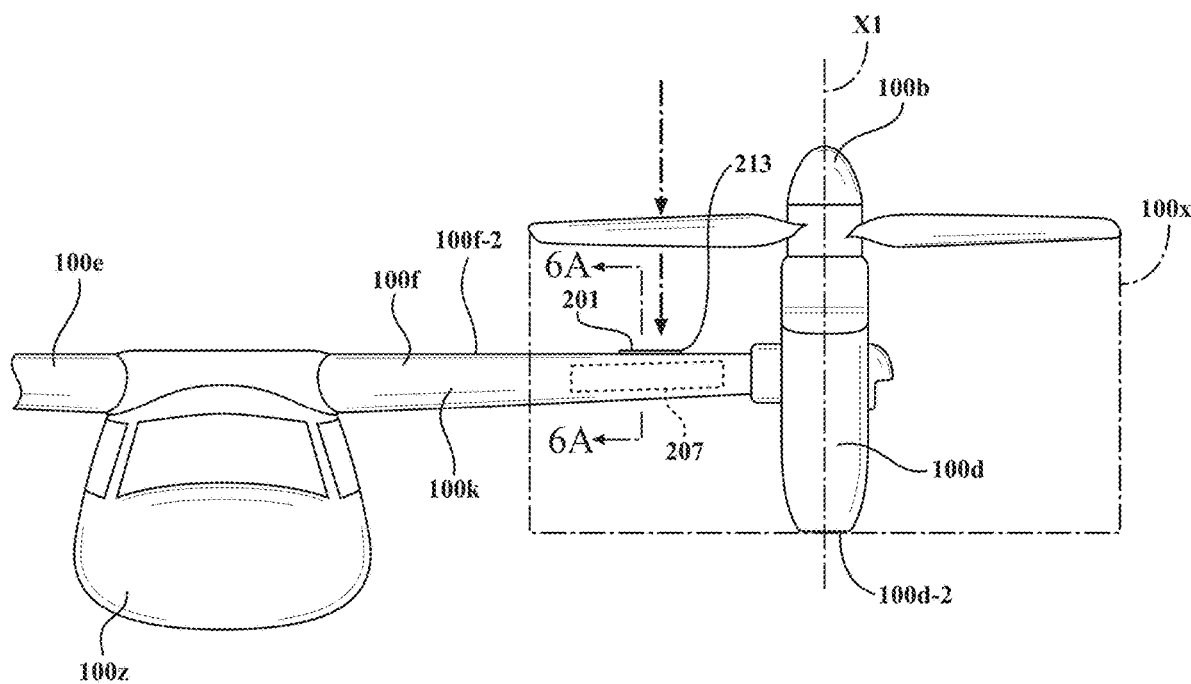
FIG. 5 is a schematic front view of a portion of the aircraft of FIG. 1, showing a propeller wash zone of a propeller of the aircraft.

Referring to FIG. 5, in particular arrangements, an air intake opening 213 and associated louvre 201 may be formed in the wing 100f at a location residing in a propeller wash zone 100x of an engine nacelle 100d mounted on the wing. The propeller wash zone 100x of the nacelle 100d may be a cylindrical volume of space extending from a rotor 100b at one end of the nacelle 100d to an opposite end 100d-2 of the nacelle. Locating the air intake opening(s) 213 in this region along the wing upper surface 100*f*-2 enables ram air from the propeller wash to be forced into the inlet(s) 213, thereby facilitating cooling of the heat-generating element 207 even when the aircraft 100 is not moving. Alternatively, an air intake 213 and associated louvre 201 may be formed in the wing 100*f* at a location residing outside the propeller wash zone 100*x*. In this case, a primary source of cooling air entering the air intake 213 may be air moving over the wing upper surface 100*f*-2 during flight or other forward movement of the aircraft.

Referring now to FIGS. 3-8C, to aid in controlling airflow into and out of the wing 100*f* and directing airflow over the various surfaces of the heat-generating element 207, a novel louvre structure 201 may be rotatably coupled to the wing 100*f* over each of the air intake openings 213. The louvre 201 may be structured to seal the air intake openings 213 when the louvre 201 is in a closed orientation as shown in FIG. 6A. For this purpose, the louvre 201 and/or the air intake opening 213 may have a suitable resilient gasket (not shown) mounted therealong and configured to be compressed between associated edges of the intake opening 213 and the louvre 201.

In one or more arrangements, the louvre 201 may include a base portion 201*a* having a first, outer surface 201*b* and a second, inner surface 201*c* residing opposite the first surface 201*b* and structured to face toward the interior 100*f*-1 of the wing. The base portion outer surface 201*b* may be shaped so as to conform to the shape of the exterior upper surface 100*f*-2 of wing 100*f*, to promote aerodynamic efficiency. Alternatively, the outer surface 201*b* may be shaped so as to conform to the shape of an exterior surface of a mounting base 211 of a louvre assembly 200 (shown in FIG. 4 and described in greater detail below) in which the louvre 201 is incorporated.

Figure 6A:
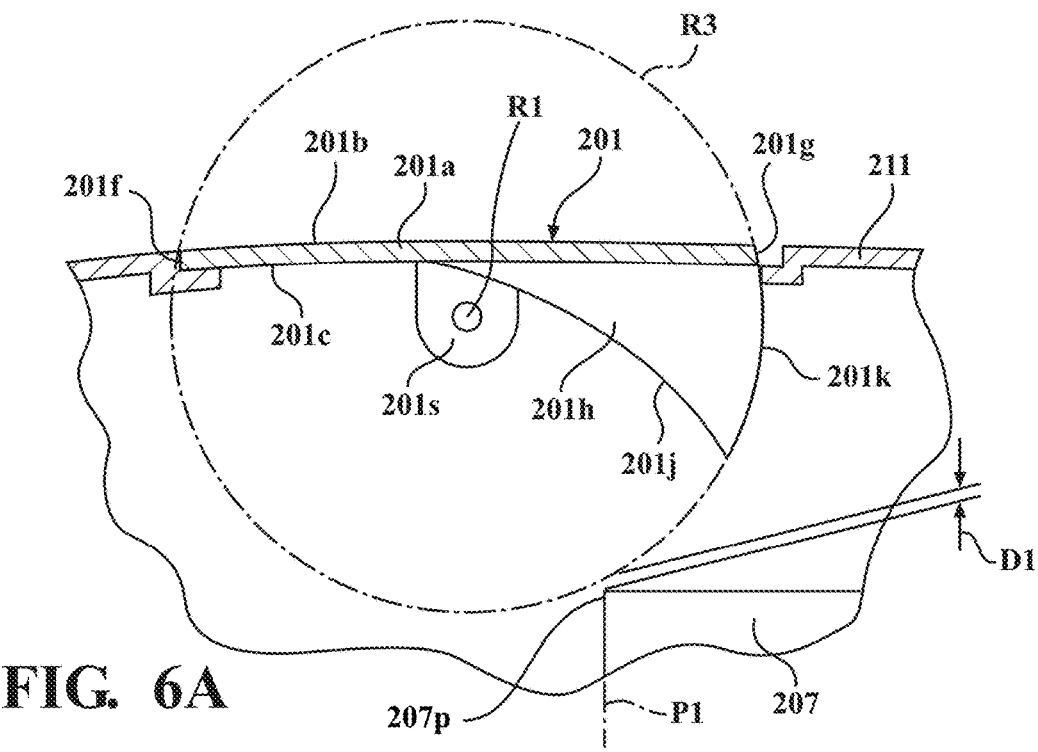
FIG. 6A is a cross-sectional view of a portion of a wing of the aircraft of FIG. 1, showing a louvre in accordance with an embodiment described herein mounted in the wing and in a closed orientation.
Figure 6B:
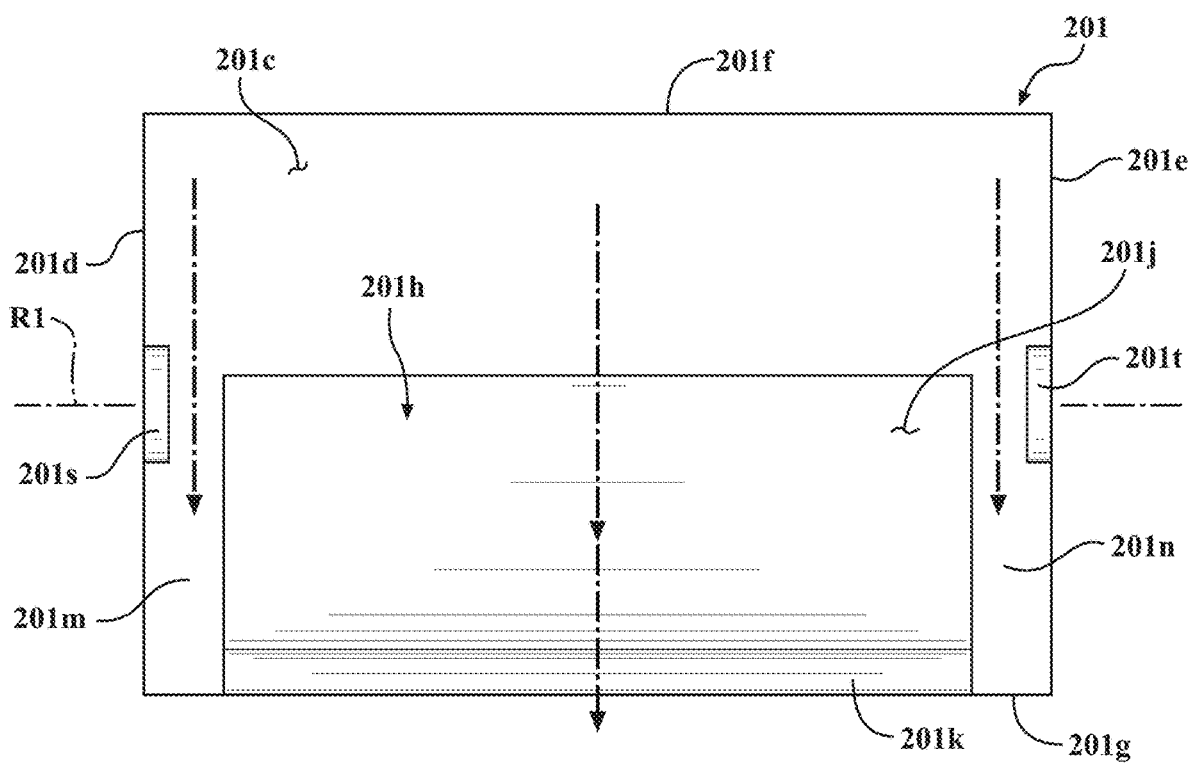
FIG. 6B is a view showing an underside of the louvre of FIG. 6A, which faces toward an interior of the aircraft wing when the louvre is mounted on the wing.

Referring to FIG. 6B, the base portion 201*a* may also include opposed side edges 201*d*, 201*e* connecting the base portion outer surface 201*b* and the base portion inner surface 201*c*. A base portion front edge 201*f* facing toward a leading edge 100*k* of the wing 100*f* may also connect the louvre base portion outer surface 201*b* and the base portion inner surface 201*c*. Referring to FIG. 6A, a rear edge 201*g* of the base portion 201*a* positioned opposite the front edge 201*f* may also connect the base portion outer surface 201*b* and the base portion inner surface 201*c*. A ramp portion 201*h* extends along part of the base portion inner surface 201*c*. In one or more arrangements, the ramp portion 201*h* may have an airflow deflection surface 201*j* extending from the base portion second surface 201*c* in a direction away from the inner surface 201*c* toward a rear end 201*k* of the ramp portion 201*h* extending proximate the base portion rear edge 201*g*. In particular arrangements, the airflow deflection surface 201*j* may be curved.

In addition, referring to FIG. 6B, the ramp portion 201*h* may be spaced apart from each of side edges 201*d*, 201*e* so as to define side airflow passages 201*m*, 201*n* extending along the base portion inner surface 201*c* between respective sides 201*p*, 201*r* of the ramp portion 201*h* and associated side edges 201*d*, 201*e* of the base portion 201*a*. The rear end portion 201*k* may be curved. In particular arrangements, the rear end portion 201*k* may have a constant radius of curvature centered at a rotational axis R1 of the louvre.

Referring again to FIG. 6A, in one or more arrangements, the louvre 201 may be structured and rotationally mounted so that the louvre rear end portion 201*k* remains at a predetermined distance D1 from a portion 207*p* of the heat generating element 207 positioned closest to the louvre 201 during rotation of the louvre. For example, as shown in the example of FIGS. 6A and 6D, a radius of the curved rear end 201*k* may coincide with a rotation radius R3 of the louvre 201. This feature aids in maintaining a minimum space D1 between the louvre 201 and the heat generating element 207 needed for rotation of the louvre without contacting the heat generating element 207. It may be desirable to keep the space D1 small to prevent leakage of cooling air through the space and away from the desired air flow paths.

FIGS. 6A-6D are schematic side views of an example of the louvre 201 showing possible operational angles of the louvre. FIG. 6A shows the louvre 201 in a closed orientation. The louvre 201 may be in this orientation, for example, when the engine mounted in the nacelle 100*d* is turned off, or when the heat-generating element 207 is at a low enough temperature that forced air cooling is not required. FIG. 6D shows the louvre 201 in a fully open or maximum open orientation. The louvre 201 may be in this orientation when the engine nacelle 100*d* is oriented vertically as shown in orientation 100R1 of FIG. 1. This orientation of the louvre 201 may enable a maximum flow of air into the opening 213 when the engine nacelle 100*d* is oriented vertically. As seen in FIG. 6D, rotation of the louvre 201 in the fully open orientation may be restricted so that the rear edge 201*g* of the base portion 201*a* does not move forward of a vertical plane P1 extending along a forward-most surface 207*a* of the heat-generating element 207. This feature helps ensure that air flowing along the base portion outer surface 201*b* flows from the base portion outer surface onto the upper surface 207*u* of the heat-generating element, and not along the front surface 207*a* of the element 207.

Figure 6C:
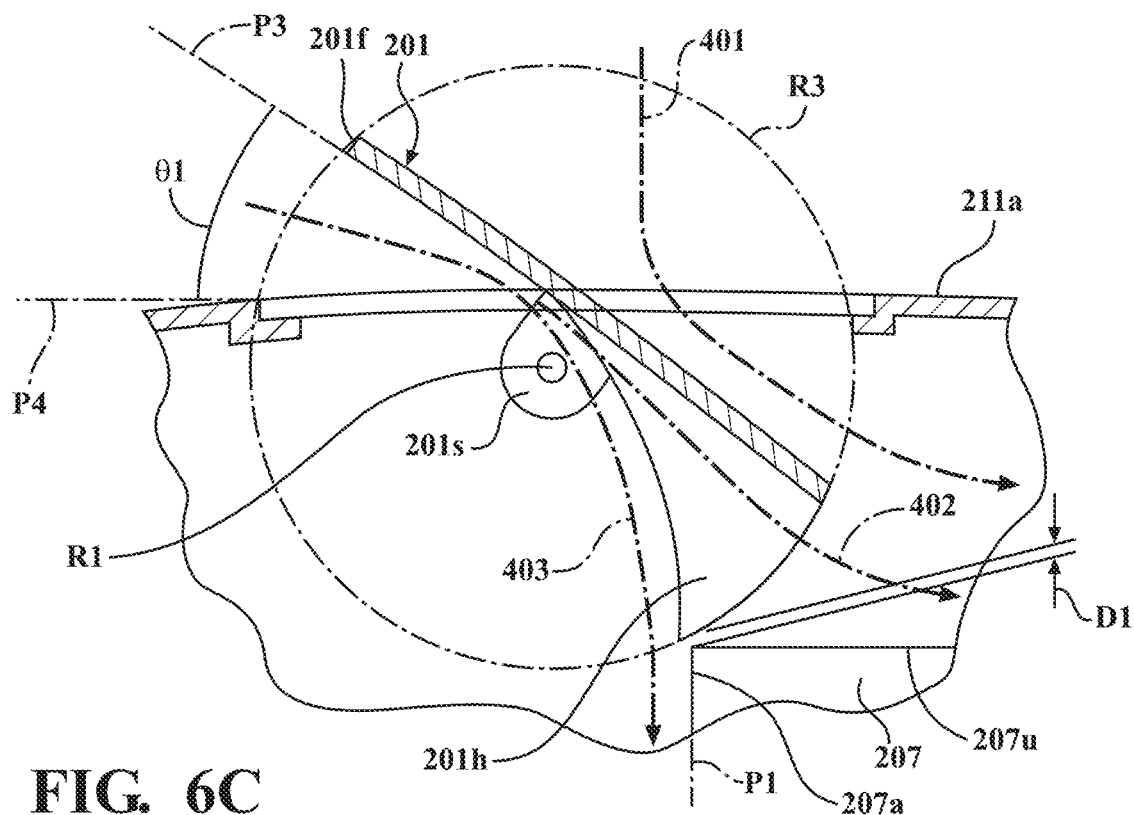
FIG. 6C is the view of FIG. 6A showing the louvre in a minimum open orientation.
Figure 6D:
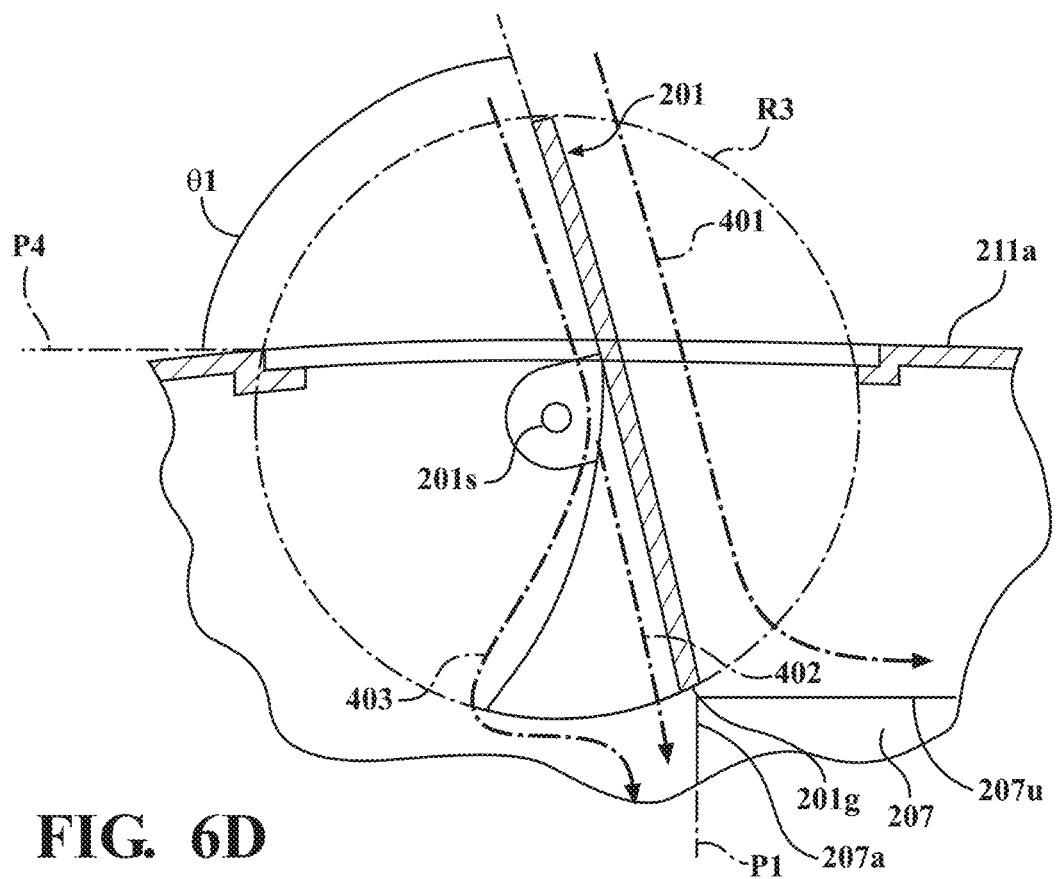
FIG. 6D is the view of FIG. 6A showing the louvre in a maximum open orientation.

FIG. 6C shows the louvre 201 in an intermediate orientation, between the closed and fully open orientations. A range of intermediate orientations exists between the closed orientation shown in FIG. 6A and the fully open orientation shown in FIG. 6D. The louvre 201 may transit these various orientations when shifting from closed to open and from open to closed. In particular arrangements, the louvre 201 may also reside in any of these orientations according to an associated angle of the nacelle 100*d* in relation to a reference surface of the wing. The louvre 201 may be in an intermediate orientation, for example, when the nacelle 100*d* is in an associated intermediate orientation during rotation of the nacelle 100*d* from lowered to raised orientation, or from raised to lowered orientation. The louvre 201 may also be in an intermediate orientation during forward motion of the aircraft 100 (e.g., during flight or taxiing). An intermediate orientation of the louvre 201 may be configured to balance the cooling airflow into the opening 213 with any drag created by the raised louvre during forward motion of the aircraft 100.

In one or more arrangements, the louvre orientation shown in FIG. 6C may be a minimum open orientation of the louvre (i.e., when rotation of the louvre is controlled to open the louvre, the louvre will open to at least the orientation shown in FIG. 6C). This arrangement may help minimize airflow migration between the ramp portion rear end 201*k* and the heat-generating element 207.

As seen in FIG. 6D, when the louvre 201 is in the fully open orientation and the engine nacelle 100*d* is raised, air striking the base portion outer surface 201*b* may be deflected so as to flow along the heat-generating element upper surface 207*u* (i.e., along path 401). A portion of the air striking the base portion inner surface 201*c* may flow along the airflow deflection surface 201*j*, around the rear end of the ramp portion 201*h*, then along the heat generating element front surface 207*a* (i.e., along path 403). Another portion of the air striking the base portion inner surface 201*c* may flow along side flow paths 201*m*, 201*n* (FIG. 6B), then along the heat generating element front surface 207*a* (i.e., along path 402). Referring again to FIG. 3, the geometry of the louvre 201 helps ensure that a flow of air is directed both along the upper 207*u* and rear 207*r* surfaces of the heat-generating element, and along the front surface 207*a* and lower 20'7*p* surfaces of the heat-generating element 207.

Figure 4:
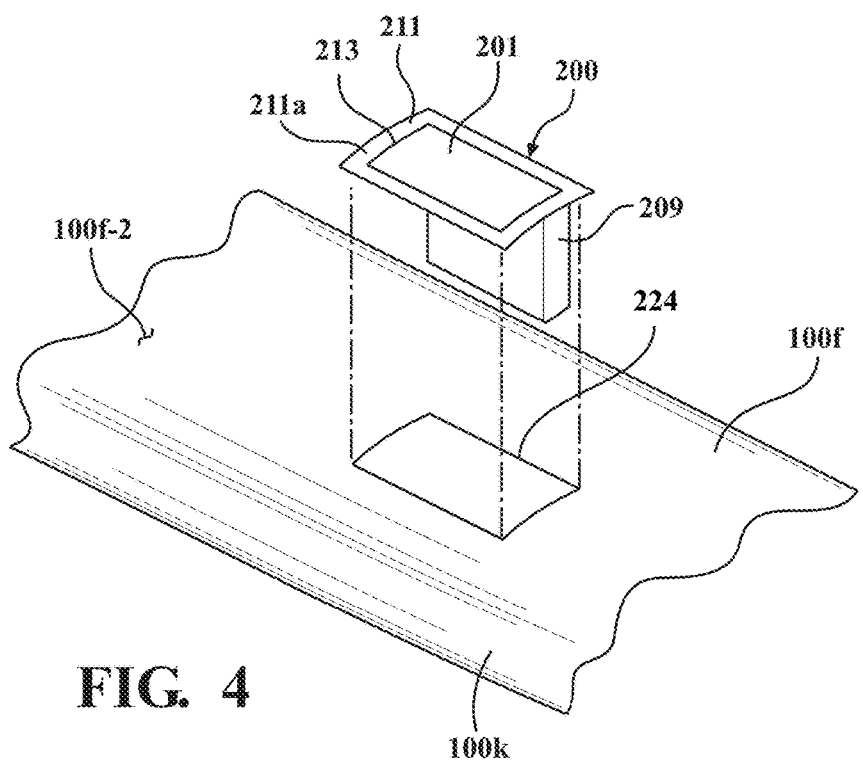
FIG. 4 is a schematic perspective view of a portion of a wing of the aircraft of FIG. 1, showing the mounting of a louvre assembly into the wing.

In one or more arrangements, the louvre 201 may be directly rotationally attached to the upper surface 100*f*-2 of the wing 100*f*. In other arrangements, as seen in FIG. 4, the louvre 201 may be incorporated into a modular louvre assembly (generally designated 200) which may be structured to be mountable in a suitable opening 224 formed in the wing upper surface 100*f*-2. The opening 224 may be spatially positioned with respect to the heat generating element 207 so that a louvre 201 of the louvre assembly 200 will be rotatable to provide cooling airflow streams as described herein when the louvre assembly 200 is mounted on the wing 100*f*.

In some arrangements, the louvre assembly 200 may include a mounting base 211 defining the air intake opening 213 over which the louvre 201 may be rotatably mounted. The mounting base 211 may be securable to the wing 100*f* so as to cover and seal the wing opening 224. The mounting base 211 may be secured to the wing 100*f* using welding, fasteners, adhesives, or any other suitable attachment means. An outer surface 211*a* of the mounting base may be shaped so as to conform to the shape of the wing upper surface 100*f*-2.

Referring to FIG. 6C, in one or more arrangements, an orientation of the louvre 201 may be expressed as an angle θ1 formed between the louvre inner surface 201*c* and a reference plane P4. In some arrangements, for use in controlling the louvre orientation angle θ1, a louvre orientation sensor 204 (FIG. 2) may be operably connected to the louvre 201 and configured to determine a rotational orientation of the louvre with respect to the reference parameter. Referring to FIG. 6C, in one or more arrangements, a plane P3 may be established extending tangent to louvre inner surface 201*c* at the forward edge 201*f* of the louvre. in this case, the louvre orientation angle θ1 may be defined as an angle formed between the plane P3 extending tangent to louvre inner surface 201*c* at the forward edge 201*f* of the louvre, and the plane P4 extending tangent to an outer surface 211*a* of the mounting base 211 at a forward edge of the opening 213 formed in the mounting base, when the louvre 201 is in an open (i.e., non-closed) condition.

In embodiments using a motor for louvre rotation control, the rotational orientation of the louvre 201 may be estimated without a louvre orientation sensor by counting the number of rotations of the motor output shaft with respect to a known reference parameter of the motor output shaft corresponding to the closed orientation of the louvre. Using this method, an rotational orientation of the louvre 201 (with respect to a louvre reference parameter value when the louvre is closed) may be estimated based on the number of output shaft rotations performed to bring the louvre 201 from the closed orientation to a given open orientation and subsequent orientations. A motor output shaft rotation counting routine may be incorporated into the louvre assembly processor 203 or louvre control module 206 and the rotation counter may be "re-zeroed" or reset every time the louvre 201 returns to its closed orientation.

Referring again to FIG. 2, a louvre actuation mechanism (generally designated 202) may be operably connected to the rotatable louvre 201 for controlling rotation of the louvre responsive to control commands from a louvre control module 206. As seen in FIG. 4, one or more elements of the louvre actuation mechanism 202 may be at least partially enclosed in a protective housing 209 attached to the mounting base 211. Elements of the louvre actuation mechanism 202 may be attached to the mounting base 211 and/or to the housing 209. The louvre actuation mechanism 202 may be any type of mechanism suitable for controlling rotation of the louvre 201 as described herein. The louvre rotation may be controlled using a pneumatic mechanism, a hydraulic mechanism, a motor, or any other type of mechanism suitable for the purposes described herein.

Figure 8A:
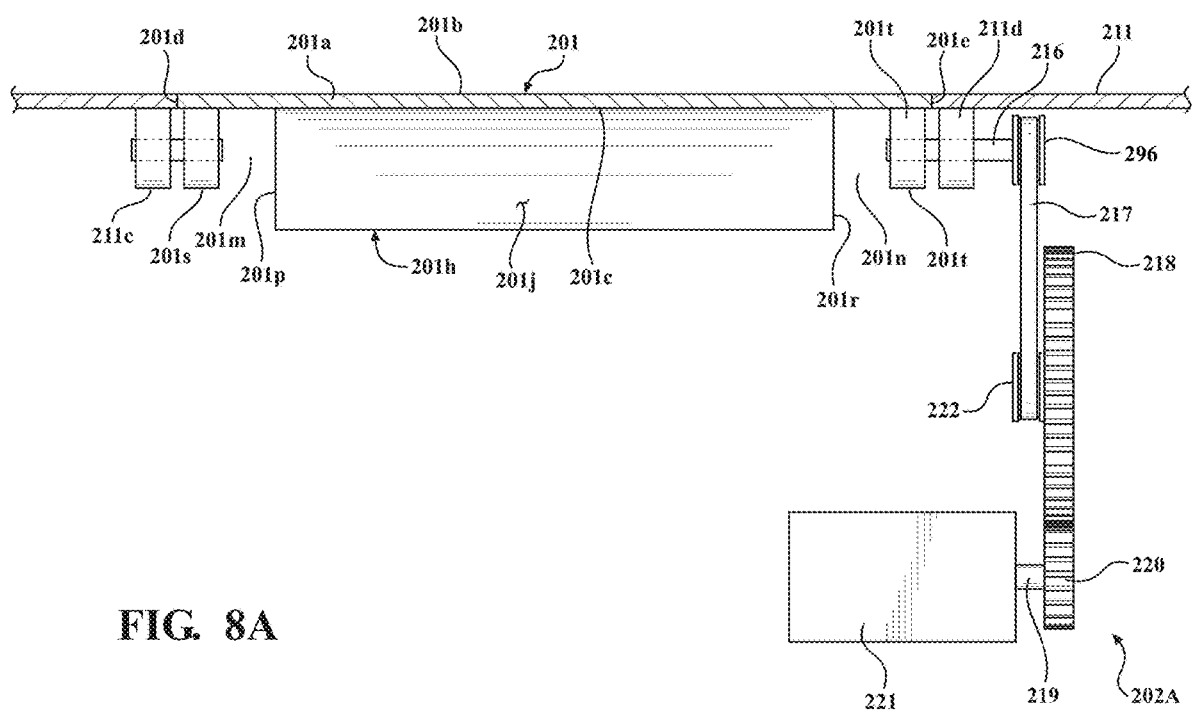
FIG. 8A is a schematic edge view of a louvre actuation mechanism in accordance with another embodiment described herein.
Figure 8B:
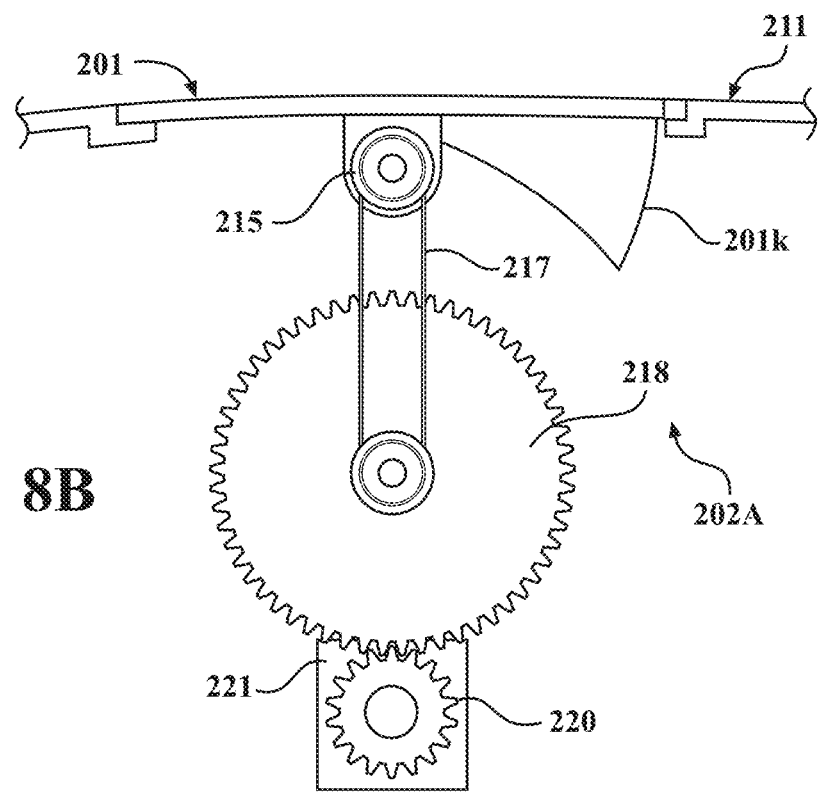
FIG. 8B is a schematic side view of a portion of the louvre actuation mechanism shown in FIG. 8A, with the louvre in the closed orientation.
Figure 8C:
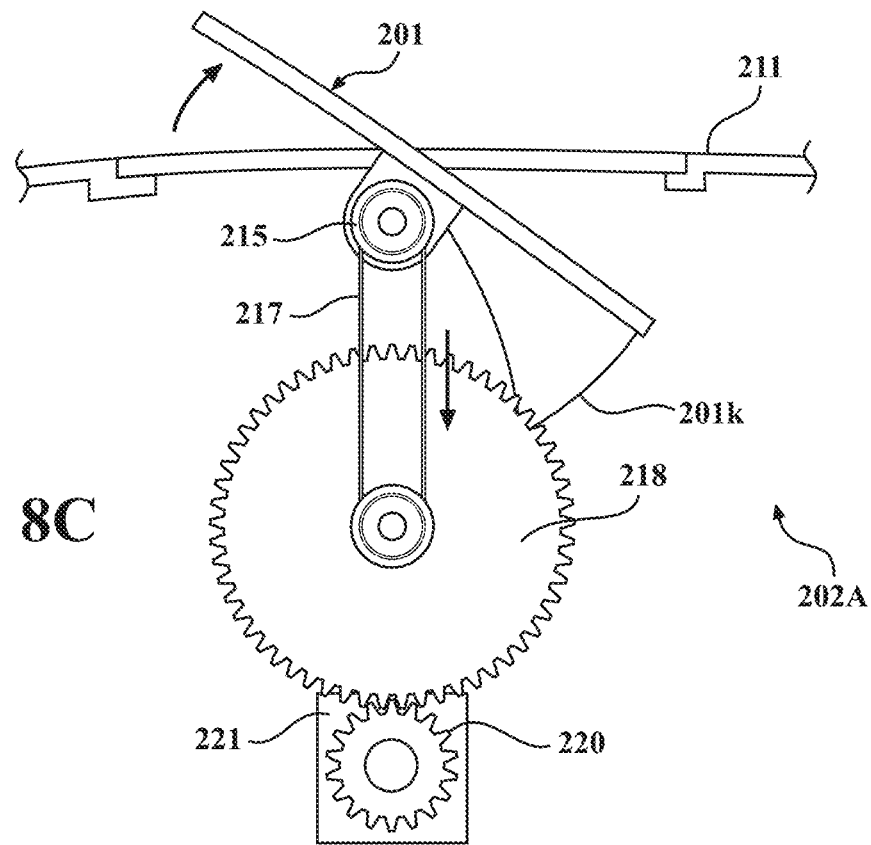
FIG. 8C is the schematic side view of FIG. 8B showing operation of the actuation mechanism to bring the louvre to an open orientation.

Referring to FIGS. 8A-8C for example, in one or more arrangements, a louvre actuation mechanism 202A may include a motor 221 and at least one gear 218 operably connecting the motor 221 with the louvre 201. The at least one gear 218 may be a reduction gear structured to translate a rotation of an output shaft 219 of the motor 221 to an associated rotation of the louvre 201. The motor 221 may be powered by a battery or other power source. In the particular example shown in FIG. 8A, the louvre 201 may be operably connected to the mounting base 211 by suitable pins or shafts extending through bosses 201*s*, 201*t* formed in the louvre 201 and associated bosses 211*c*, 211*d* formed in the mounting base 211. A first pulley or wheel 296 may be affixed to an end of a shaft 216. Motor 221 having output shaft 219 may be attached to the mounting base 211 or to the housing 209 (not shown) enclosing the actuation mechanism elements. An output gear 220 may be attached to the motor output shaft 219. The output gear 220 may mesh with reduction gear 218 which is also rotatably attached to the mounting base or housing. A second pulley or wheel 222 may be attached to the reduction gear 218 so as to be coaxial with (and rotate in conjunction with) the reduction gear, at the same angular rotation rate as the reduction gear. A belt or chain 217 may extend between the first and second pulleys 296, 222 for driving the first pulley 296 at the same rotation rate as the second pulley 222 when the second pulley is rotated by rotation of the reduction gear 218.

Operation of the motor 221 may be controlled by a louvre assembly processor 203 (FIG. 2) operably connected to the motor. The processor 203 may execute instructions for louvre control stored in computer-readable form on a louvre control module 206 as described in greater detail below. By use of the motor 221, reduction gear 218 and belt 217, rotation of the motor output shaft 219 may produce an associated incremental rotation of the louvre 201 responsive to control commands, for any desired angle in the entire range of motion of the louvre θ1. This capability may enable the orientation angle of the louvre 201 to be controlled to match any orientation angle θ2 of an associated engine nacelle, as described herein.

In particular arrangements, and in embodiments where a motor is used to control rotation of the louvre continuously over a range of angles, the louvre orientation angle θ1 may be controlled to match an associated nacelle orientation angle θ2 during rotation of the nacelle. This angular orientation of the louvre may provide the most efficient flow of cooling air to the air intake for any given angular orientation of the nacelle.

Figure 7A:
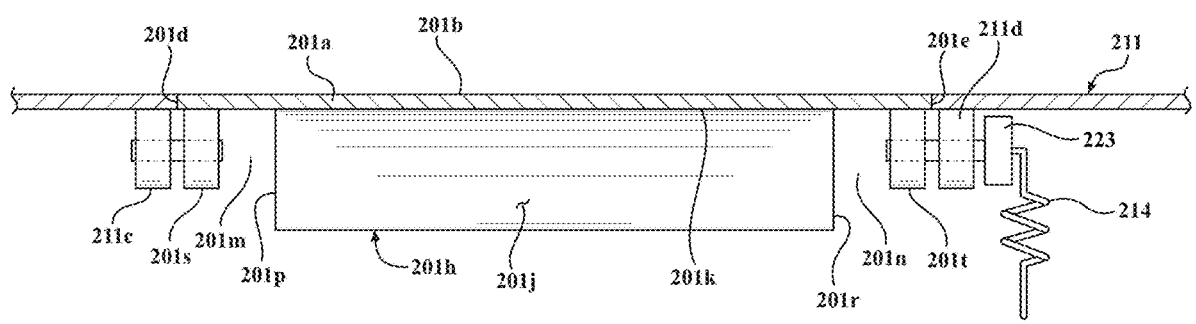
FIG. 7A is a schematic edge view of a louvre actuation mechanism in accordance with an embodiment described herein.
Figure 7B:
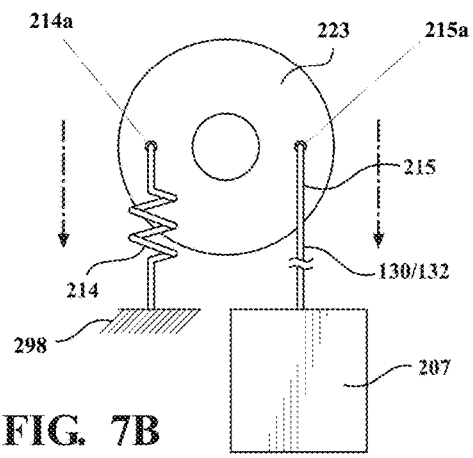
FIG. 7B is a schematic side view of a portion of the louvre actuation mechanism shown in FIG. 7A.

Referring to FIGS. 7A-7B, in another particular example, the louvre 201 and louvre shaft 216 may be operably connected (through the louvre wheel 223) to a spring member 214 extending between the louvre wheel 223 and a static anchor point 298 (located, for example, on the actuation mechanism housing 209 (not shown in FIGS. 7A-7B). The spring member 214 may be structured to exert a force on the louvre 201 in a direction F1, thus biasing rotation of the louvre 201 toward a closed orientation of the louvre. The louvre 201 and louvre shaft 216 may also be operably connected (through the louvre wheel 223) to a shape-memory material (SMM) member 215 structured to be energizable to exert a force F2 to rotate the louvre 201 in an opposite direction toward an open orientation of the louvre 201 and against the biasing force exerted by the spring member 214.

The SMM member 215 may extend between an attachment location 215a on the wheel 223 and an energization source. The energization source may be the heat generating element 207 battery powering the aircraft or another source. As described herein, the energization source may provide heat or electrical power needed to heat the SMM member 215 to a temperature where the desired phase transformation occurs in the shape memory material of the SMM member 215. Thus, when the shape-memory material member 215 is energized by application of heat or an electric current, the member may contract to overcome the biasing spring force, thereby forcing the louvre 201 to open. In one or more arrangements, the SMM member 215 may be (or include) an SMA wire.

In control arrangements using an SMA wire as described, the louvre 201 may be rotatable only to a closed orientation and a single open orientation. In such arrangements, the open louvre orientation may be the minimum open orientation shown in FIG. 6C, which may enable some flow of air into the air intake when the nacelle 100d is lowered, when the nacelle 100d is raised, and for all orientations of the nacelle between the lowered and raised orientations.

In one or more arrangements, an SMM energizing unit (not shown) may be provided to for energizing the SMA wire through application of heat or an electric current to the wire. The SMM energizing unit may include a heating element or a current source. The SMM energizing unit may be operably connected to one or more batteries positioned in the wing interior 100f-1 to supply power for energizing SMA wire. The SMM energizing unit may include all control circuitry and other elements (e.g., a transformer) necessary for controlling energization of the SMA wire as described herein, responsive to instructions received from the louvre control module. In one or more arrangements, the SMM energizing unit may receive power from the heat generating element 207 or another power source.

Pertinent parameters such as the SMA wire properties, the properties of spring member 214, the locations of the attachment points 214a, 215a of each of the spring member 214 and the SMM member 215 to the wheel 223, and other parameters may be determined analytically and/or iteratively by experimentation so as to balance the resulting rotation moments acting on the wheel 223, to achieve the desired operational louvre control effects. For example, the attachment locations 214a, 215a may be specified so that the biasing spring force acting on the louvre 201 is sufficient to close the louvre when the SMM member 215 is unenergized, and also to stretch the wire by an amount sufficient to enable contraction of the wire (when energized) so as to overcome the spring force by rotating the wheel 223 in direction F2, thereby opening the louvre. Alternative, suitable actuation mechanisms may also be used.

An SMM (shape memory material) member 215, as used herein, may be a member which includes a SMM, such as a wire which is composed of a SMM material. SMMs are compositions which undergo a reversible transformation in response to a change in temperature or other input. SMMs can generally include shape-memory alloys (SMA) and shape-memory polymers (SMP). SMAs undergo a thermo-elastic phase transformation in passing from a one phase (e.g., a martensitic phase) to another phase (e.g., an austenitic phase) when heated to a temperature above the phase change transition temperature. Below the phase change transition temperature, the alloy can be readily plastically deformed by as much as a few percent. The SMA remains deformed until heated to or above the phase change transition temperature, at which point the SMA reverts to its original or memory shape. Some SMAs have a resistivity which can be employed for direct heating (e.g., resistive heating by an electric current). As used herein, the phrase "heated to or above the phase change transition temperature" refers to both heating the alloy to a temperature within the phase change transition temperature range or above this range.

In some implementations, the SMM member 215 can be (or include) a SMA wire (not individually shown). In some instances, it can also include a heating element (not shown). In some arrangements, the heating element surrounds the SMA wire along a length of the wire. However, the heating element can alternatively have any form of operative connection to the SMA wire, such that heat can be delivered. The SMA wire can be configured to increase or decrease in length (and/or other dimension) upon changing phase, for example, by being heated to a phase transition temperature.

In some arrangements, SMAs can be compositions which transition from a soft martensitic metallurgical state to a hard austenitic metallurgical state in response to heating above an austenitic transition temperature, $A_f$. The SMA can be processed while in a high-temperature austenitic phase to a desired configuration. The SMA can be cooled below a second transition temperature Mf without change of physical dimensions to create a "memory" of the desired configuration (i.e., a memorized configuration), where Mf is between the austenitic and martensitic states. Once the desired configuration is memorized, the SMA can be mechanically deformed into a first configuration while in the martensitic state. The SMA can remain in this first configuration or allow for other deformation until further heating to a temperature above $A_f$. Once heated above the $A_f$, the SMA can revert to the memorized configuration (which can also be referred to as the second configuration). During the transition from the first configuration to the second configuration, the SMA can exert large forces on elements of the actuation mechanism to which it is connected. Thus, after processing the SMA to achieve the memorized configuration, an SMA wire employed as shown in FIGS. 7A-7B may be stretched into a first configuration by contraction of the biasing spring member 214 to close the louvre 201. Once heated above the $A_f$, an SMA wire of the SMM 215 may contract to the memorized/second configuration to overcome the spring force and rotate the louvre 201 to the minimum open orientation shown in FIG. 6C.

In some implementations, the SMM member 215 can comprise an SMA material with a high $A_f$ temperature, such as a $A_f$ temperature between about 90° C. and about 110° C. In further implementations, the SMM member 215 does not utilize a heating element, such as when employing a SMA which can be resistively heated using an electrical current. One example of a suitable SMM member 215 can include Nickel-Titanium (Ni—Ti), which has resistivity allowing it to be heated directly with an electrical current.

Conversely, when increasing in temperature, the SMA wire can transition from a predominantly martensitic state to a predominantly austenitic state. The transition in states can result in the SMA changing from the first configuration to the second configuration, or vice versa. In some implementations, SMAs which can be used with one or more implementations described herein can include Ni—Ti, Ni—Ti-Niobium (Nb) alloys, Ni—Ti-Iron (Fe) alloys, Ni—Ti-copper (Cu) alloys, Ti-Palladium (Pd) alloys, Ti—Pd—Ni alloys, Ni—Ti—Cu alloys, Ti—Nb-Aluminum (Al) alloys, Hf—Ti—Ni alloys, Ti—Nb, Ni—Zr—Ti alloys, beta-phase titanium and combinations thereof. In some implementations, the first configuration can be maintained by the SMA wire e.g., a static first configuration). In implementations having a static first configuration, the SMA wire can be referred to as having a two way shape-memory effect. Two way shape-memory effect (TMSME) refers to a SMA which has a specific memorized shape in both the martensitic state and in the austenitic state. In further implementations, the first configuration can be considered dynamic, as the first configuration is not programmed to the SMA wire. In further implementations, the SMM member 215 can be a SMP.

The SMM member 215 can be heated in any suitable manner, now known or later developed. For instance, an SMA wire of the SMM member 215 can be heated by the Joule effect by passing electrical current through the wire. In some implementations, the SMM member 215 can include a heating element as previously described. The heating element can include one or more components configured to increase the temperature of the SMA wire, such as a resistive heating element. The heating element can be in operative connection with the SMA wire. For example, a heating element can be positioned around or enclose the entirety of the SMA wire, or the heating element can be positioned or configured to affect any portion of the SMA wire. In particular implementations, the heating element can be aligned parallel with the SMA wire. The heating element can further be in operative connection with a computing device, such as louvre assembly processor 203. The heating element can receive an input, such as an electrical input from the computing device. In response to the input, the heating element can provide heat for the SMA wire resulting in a transition from a first configuration to a second configuration as described above. In some instances, arrangements can provide for cooling of the SMA wires, if desired, to facilitate the return of the wires to the first configuration.

"Energization" of the SMM member or "energizing" the SMM member may include providing power necessary to heat an SMA wire of the SMM member 215 by the Joule effect and/or power to any heating element operably connected to the SMA wire for heating the wire so that the wire is heated above the phase change transition temperature.

In one or more arrangements, the SMM member 215 may include a covering (not shown) configured to electrically and/or thermally isolate the member 215 and prevent contact with adjacent elements of the louvre actuation mechanism 202. In one or more arrangements, the covering may be a silicone or rubber-based material. The covering material may be structured to be stretchable to accommodate (and responsive to) changes in SMA wire dimensions of the SMM an energization input is applied to the SMM member 215. The stretchability of the covering may minimize reaction forces on the SMA wire and restriction of the wire dimensions responsive to application of the input. In one or more arrangements, the covering material may be thermally and/or electrically-insulative. In one or more arrangements, the covering material may be formulated to accommodate operation of embodiments of the SMM member 215 and actuation mechanism as described herein for thousands of actuation cycles, without fracturing or otherwise failing.

Referring to FIGS. 7A-7B, the louvre 201 may be biased in the closed condition shown in FIG. 6A the force exerted by spring member 214. In operation, to open the louvre 201 to the minimum open orientation shown in FIG. 6C, an SMA wire of the energized SMM member 215 may increase in temperature in response to an energization input, such as from a computing device and/or a power source. An SMA wire of the SMM member 215 can heat up in response to the resistance of the wire to electrical input or heating by a heating element. The SMA wire, upon reaching a transition temperature $A_f$, changes from the first configuration to a second configuration. In this implementation, the SMA wire in the second configuration can contract in direction F2, thereby applying a force on the wheel 223 which causes rotation of the wheel to overcome the force exerted on the wheel by spring member 214. As a result, the louvre 201 is rotated into an open orientation.

Referring again to FIG. 2, in some arrangements, the louvre assembly 200 may include a memory 205. For control of the louvre 201, the memory 205 may store a louvre control module 206 as described in greater detail below. The memory 205 is a random-access memory (RAM), read-only memory (ROM), a hard-disk drive, a flash memory, or other memory suitable for storing the module 206.

The louvre assembly 200 may include a wireless communications interface 171 configured to enable and/or facilitate communication between the components and systems of the aircraft 100 and entities exterior of the vehicle. For example, the interface 171 may be configured to receive data acquired by an associated nacelle orientation sensor 124 and transmitted directly from the sensor 124 or via aircraft wireless communications interface 169. The data may indicate a current rotational orientation of the associated engine nacelle. This data may be used as described herein in controlling the rotational orientation θ1 of a louvre mounted in a prop wash zone of the louvre.

The louvre assembly 200 may include a louvre orientation sensor 204 operably connected to the louvre 201 and configured to determine a rotational orientation of the louvre 201 with respect to some reference parameter, as previously described. Data from the louvre orientation sensor 204 may be utilized by the louvre control module 206, in conjunction with data from an associated nacelle orientation sensor 124 and a heat generating element temperature sensor 123, to formulate control commands for the louvre orientation angle in a manner described herein.

The aircraft 100 can include one or more modules, at least some of which are described herein. The modules can be implemented as computer-readable program code that, when executed by processor(s) of the aircraft 100, implement one or more of the various processes described herein. One or more of the modules can be a component of the associated processor(s), or one or more of the modules can be executed on and/or distributed among other processing systems to which the processor(s) is operably connected. The modules can include instructions (e.g., program logic) executable by one or more processor(s). Alternatively, or in addition, one or more of data store(s) 115 and/or other portions of the aircraft 100 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some arrangements, memory 112 may store various modules (such as modules 160, 208) used for controlling operations of aspects of the aircraft other than the louvres 201. The memory 112 is a random-access memory (RAM), read-only memory (ROM), a hard-disk drive, a flash memory, or other suitable memory for storing the modules 160, 208. The modules 160, 208 are, for example, computer-readable instructions that when executed by the processor 110, cause the aircraft processor(s) 110 to perform the various functions disclosed herein. Additional modules (not shown) may also be stored in memory 112.

In one or more arrangements, the memory 112 may store an autonomous piloting module 160. The autonomous piloting module 160 can be configured to receive data from the sensor system 120 and/or any other type of system capable of capturing information relating to the aircraft 100 and/or the external environment of the aircraft 100. The autonomous piloting module 160 can determine position and velocity of the aircraft 100. The autonomous piloting module 160 can determine the location of obstacles or other environmental features such as trees, other aircraft, etc. The autonomous piloting module 160 can be configured to receive, and/or determine location information for obstacles within the external environment of the aircraft 100 for use by the processor(s) 110 and/or any other module described herein to estimate orientation of the aircraft 100, vehicle position in global coordinates based on signals from a plurality of satellites, or any other data and/or signals that could be used to determine the current state of the aircraft 100 or determine the position of the aircraft 100 with respect to its environment for use in either creating a map or determining the position of the aircraft 100 in respect to map data.

The autonomous piloting module 160 can be configured to determine travel path(s), current autonomous flying maneuvers for the aircraft 100, future autonomous flying maneuvers and/or modifications to current autonomous flying maneuvers based on data acquired by the sensor system 120 and/or information received from a navigation system, such as navigation system 147. "Flying maneuver" means one or more actions that affect the movement of the aircraft. Examples of flying maneuvers include: accelerating, decelerating, braking, turning, ascending, and descending, just to name a few possibilities. The autonomous piloting module 160 can be configured can be configured to implement determined flying maneuvers. The autonomous piloting module 160 can cause, directly or indirectly, such autonomous flying maneuvers to be implemented. As used herein, "cause" or "causing" means to make, force, compel, direct, command, instruct, and/or enable an event or action to occur or at least be in a state where such event or action may occur, either in a direct or indirect manner.

The autonomous piloting module 160 can be configured to execute various vehicle functions and/or to transmit data to, receive data from, interact with, and/or control the aircraft 100 or one or more systems thereof (e.g., one or more of vehicle systems 140). The autonomous piloting module 160 may be configured to autonomously control the aircraft 100 so as to fly the vehicle along a projected path, from an initial or start location to a destination.

The memory 112 may have stored thereon one or more engine nacelle control module(s) 208. The nacelle control module(s) 208 may include computer-readable instructions that when executed by the processor(s) 110 cause the processor(s) to autonomously control operation of the engine nacelles 100c, 100d to raise and lower the nacelles responsive to aircraft control commands generated by a human user piloting the aircraft and/or by an autonomous piloting module 160 configured to autonomously control takeoff, flight, and/or landing of the aircraft 100.

The processor(s) 110, the autonomous piloting module 160, the nacelle control module(s) 208 and/or any other vehicle modules can be operably connected to communicate with each other and with the other elements of the vehicle, including various vehicle systems 140 and/or individual components thereof. For example, referring to FIG. 2, the processor(s) 110 the autonomous piloting module 160, and the navigation system 147 can be in communication to send and/or receive information from the various vehicle systems 140 to control the movement, speed, maneuvering, heading, direction, etc. of the aircraft 100. The processor(s) 110, the autonomous piloting module 160, the nacelle control module(s) 208, and/or other elements of the vehicle may control some or all of the vehicle systems 140 and, thus, may be partially or fully autonomous. For instance, when operating in an autonomous mode, the processor(s) 110 and/or the autonomous piloting module 160 can control the direction and/or speed of the aircraft 100. The processor(s) and/or the autonomous piloting module 160 can cause the aircraft 100 to accelerate (e.g., by increasing the supply of fuel provided to the engines), decelerate and/or change direction (e.g., by operating the various control surfaces of the aircraft).

In one or more arrangements, aircraft processor(s) 110 may be configured to execute modules stored in memory 112, and louvre assembly processor 203 may be configured to execute any modules (such as louvre control module 206) stored in memory 205 as described in greater detail below. In other arrangements, one or more of the louvre control module(s) 206 may also be stored on the aircraft memory 112 and instructions stored on the module(s) 206 may be executed by processor(s) 110.

In one or more aspects, the louvre control module 206 may include computer-readable instructions that when executed by the processor 203 cause the processor to autonomously control operation of the louvre actuation mechanism 202 to control rotation of the louvre 201 responsive to a temperature of a heat-generating element (such as element 207) mounted in the wing interior.

In one or more aspects, the louvre control module 206 may include computer-readable instructions that when executed by the processor 203 cause the processor to autonomously control operation of the louvre actuator mechanism 202 to control rotation of the louvre 201 responsive to an orientation of an associated engine nacelle (such as nacelle 100d) operably connected to a wing (such as wing 100f). For example, in a situation where a temperature of the heat-generating element 207 exceeds a predetermined threshold, the louvre control module 206 may control rotation of the louvre in accordance with an orientation of the associated engine nacelle and the capabilities of the louvre actuation mechanism 202 associated with the louvre 201.

The louvre control module 206 may include computer-readable instructions that when executed by the processor 203 cause the processor to autonomously control operation of the louvre actuation mechanism 202 to control rotation of the louvre 201 so that the louvre orientation angle θ1 matches a rotational orientation θ2 of the engine nacelle when the nacelle is in an intermediate orientation.

The louvre control module 206 may include computer-readable instructions that when executed by the processor 203 cause the processor to autonomously control operation of the louvre actuation mechanism 202 to control rotation of the louvre 201 to a minimum open orientation when the engine nacelle 100d is in a lowered orientation. This may ensure a flow of cooling air to the heat-generating element 207 when even when the aircraft 100 is not moving forward in flight.

The louvre control module 206 may include computer-readable instructions that when executed by the processor 203 cause the processor to autonomously control operation of the louvre actuation mechanism 202 to control rotation of the louvre 201 so that the louvre is in the maximum open orientation (FIG. 6D) when the engine nacelle is in a raised orientation.

In one or more arrangements, the nacelle rotational orientation θ2 may be determined with respect to a reference plane defined with respect to a feature of the aircraft 100. Alternatively, the nacelle rotational orientation θ2 may be determined with respect to another feature or using a method other than establishing a reference plane. As the reference plane P4 (FIG. 6C) used for determining the louvre orientation angle θ1 is static with respect to both the nacelle 100d and the louvre 201, the relationship between the louvre reference plane P4 and any given nacelle orientation may be determined during design or fabrication of the aircraft and stored in a memory (in lookup tables for example) for use in correlating the louvre orientation and the nacelle orientation. For example, a desired louvre orientation angle θ1 for each possible intermediate nacelle orientation may be determined and associated with the intermediate nacelle orientation in a lookup table. Then, when it is desired to rotate the louvre 201 so as to match the current rotational orientation of the nacelle 100d, the louvre orientation θ1 corresponding to the current orientation of the nacelle may be retrieved from the lookup table and louvre control module 206 may control rotation of the louvre 201 to match the louvre orientation with the nacelle orientation. That is, the louvre control module 206 may include instructions that when executed by the processor cause the processor to control operation of the louvre actuation mechanism 202 to control rotation of the louvre 201 so that the louvre orientation angle θ1 matches the nacelle rotational orientation θ2. This capability may be especially useful for efficiently guiding cooling air into the air intake opening 213 when the nacelle 100d is in an intermediate orientation and in the process of being raised or lowered.

The louvre assembly 200 may include a wireless communications interface 171 configured to enable and/or facilitate communication with communications interface 169 for receiving nacelle orientation information acquired by nacelle orientation sensors 124, and for receiving data regarding the temperature of a heat generating element 207 positioned for cooling by an airflow controlled by the louvre 201. The louvre control module 206 may be configured to, using the nacelle orientation information, correlate the current orientation of the nacelle 100d with the current orientation of a louvre 201 in the propeller wash zone 100x of the nacelle. The louvre control module 206 may be configured to, based on this correlation and the temperature of the heat generating element 207, control operation of the louvre actuation mechanism 202 to control rotation of the louvre 201 to adjust the orientation of the louvre 201 or to retain a current orientation of the louvre. Alternatively, the louvre control module 206 may be configured to receive nacelle orientation sensor data from a hard-wired connection.

Figure 9:
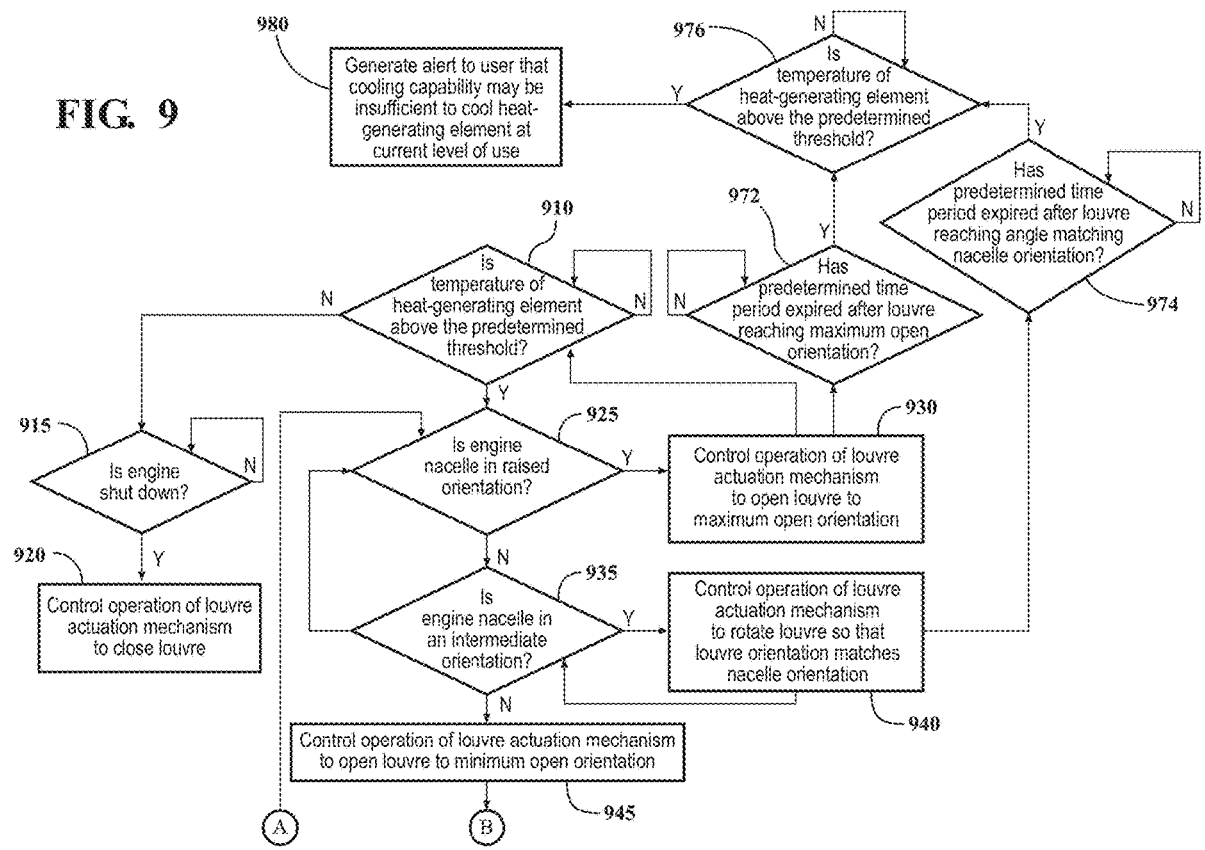
FIG. 9 is a flow diagram illustrating operation of louvre actuation mechanism in accordance with FIGS. 8A-8C mounted in the aircraft wing.
Figure 9:
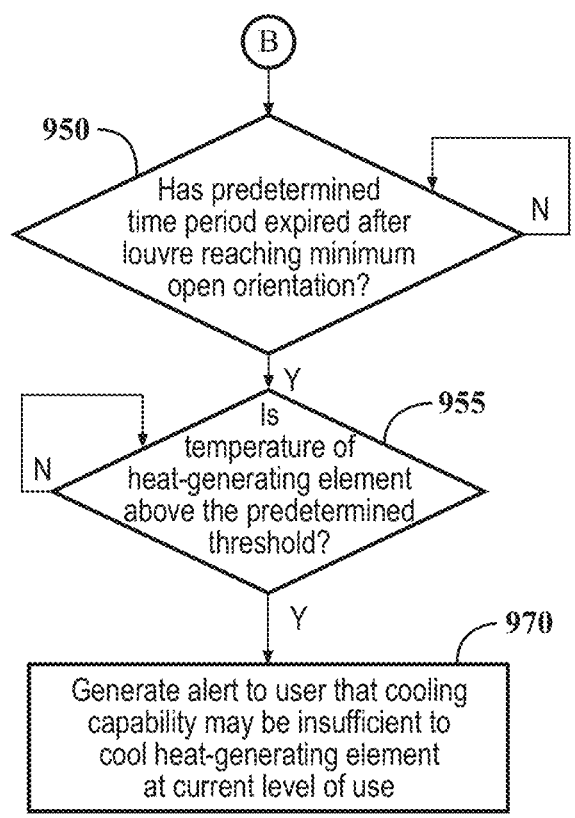

FIG. 9 is a flow diagram illustrating operation of an embodiment of a louvre control system incorporating a louvre actuation mechanism as shown in FIGS. 8A-8C, where the louvre actuation mechanism includes a motor (such as motor 221) or is otherwise configured to control the louvre orientation angle θ1 to achieve an angle that matches the rotational orientation of the nacelle 100d when the nacelle is in an intermediate orientation.

The louvre control module 206 may be configured to (in block 910) (constantly or intermittently) receive temperature data from the heat-generating element temperature sensor(s) 123 configured to measure the temperature of a heat-generating element aligned with the louvre 201 controlled by the louvre control module 206. The louvre control module 206 may continue to monitor the heat-generating element temperature until the temperature exceeds a predetermined threshold, indicating that the heat-generating element may be overheating. Also, while monitoring the temperature of the heat-generating element 207, the louvre control module 206 may (in block 915) constantly monitor a status of the engine nacelle 100d to determine if the engine is shut down. If, at any time, the engine in the nacelle 100d shuts down, the louvre control module 206 may (in block 920) control operation of louvre actuation mechanism 202 to close the louvre 201.

Returning to block 910, if the temperature of the heat-generating element exceeds the predetermined threshold, the louvre control module 206 may (in block 925) determine if the engine nacelle 100d is in the raised orientation (FIG. 1, 100R). If the temperature of the heat-generating element 207 has become excessive while the engine nacelle 100d is in the raised orientation, the louvre control module 206 may (in block 930) control operation of the louvre actuation mechanism 202 to open the louvre 201 to the maximum open orientation shown in FIG. 6D. This orientation of the louvre 201 may help ensure a maximum flow of cooling air to the heat-generating element for the raised orientation of the nacelle 100d. The louvre 201 may remain in this maximum open orientation angle as long as the nacelle 100d remains in the raised rotational orientation.

After the louvre 201 has reached the maximum open orientation angle, the louvre control module 206 may (in block 972) determine when a predetermined time period has expired after the louvre 201 reaching the maximum open orientation. This allows a period of time for any cooling air admitted by the open louvre to cool the heat-generating element 207. After passage of the predetermined time period, the louvre control module 206 may (in block 976) determine if the temperature of the heat-generating element 207 is above the predetermined threshold. If the temperature of the heat-generating element 207 is not above the predetermined threshold, the louvre control module 206 may continue to monitor the temperature. The louvre control module 206 may be configured to, if the temperature of the heat-generating element 207 is above the predetermined threshold even after opening of the louvre 201 and passage of the predetermined time period, generate an alert to user that the cooling capability of the airflow admitted by the open louvre 201 may be insufficient to cool the heat-generating element 207 at its current level of use.

Returning to block 925, if the engine nacelle 100d is not in the raised orientation, the louvre control module 206 may (in block 935) determine if the engine nacelle 100d currently resides in an intermediate orientation (i.e., between the raised orientation of FIG. 1, 100R and the lowered orientation of FIG. 1, 100L). If the engine nacelle 100d is in an intermediate orientation, the louvre control module 206 may (in block 940) control operation of the louvre actuation mechanism 202 to rotate the louvre 201 so that the louvre orientation angle θ1 matches the nacelle rotational orientation θ2. This orientation of the louvre 201 may help ensure the most effective flow of cooling air to the heat-generating element 207 for a given intermediate orientation of the nacelle 100d, while at the same time minimizing aerodynamic drag due to the raised louvre. The louvre 201 may be controlled to match the nacelle rotational orientation as long as the nacelle 100d remains in an intermediate rotational orientation.

After the louvre 201 has reached a matching orientation, the louvre control module 206 may (in block 974) determine when a predetermined time period has expired after the louvre 201 reaching the matching orientation. This allows a period of time for any cooling air admitted by the open louvre to cool the heat-generating element 207. After passage of the predetermined time period, the louvre control module 206 may (in block 976) determine if the temperature of the heat-generating element 207 is above the predetermined threshold. If the temperature of the heat-generating element 207 is not above the predetermined threshold, the louvre control module 206 may continue to monitor the temperature. The louvre control module 206 may be configured to, if the temperature of the heat-generating element 207 is above the predetermined threshold even after opening of the louvre 201 and passage of the predetermined time period, generate an alert to user that the cooling capability of the airflow admitted by the open louvre 201 may be insufficient to cool the heat-generating element 207 at its current level of use (block 980).

Returning to block 935, if the engine nacelle 100d is not in an intermediate orientation, the louvre control module 206 may assume that the nacelle 100d is in the lowered orientation of FIG. 1, 100L. The louvre control module 206 may then (in block 945) control operation of the louvre actuation mechanism 202 to open the louvre 201 to the minimum open orientation shown in FIG. 6C. This orientation of the louvre 201 may help ensure the most effective flow of cooling air to the heat-generating element 207 when the nacelle 100d resides in the lowered orientation, while at the same time minimizing aerodynamic drag due to the raised louvre. The louvre control module 206 may be configured to (block 950), after the louvre 201 has reached the minimum open orientation, determine when a predetermined time period has expired after the louvre 201 reaching the minimum open orientation. This allows a period of time for any cooling air admitted by the open louvre to cool the heat-generating element 207.

After passage of the predetermined time period, the louvre control module 206 may (in block 955) determine if the temperature of the heat-generating element 207 is above the predetermined threshold. If the temperature of the heat-generating element 207 is not above the predetermined threshold, the louvre control module 206 may continue to monitor the temperature. The louvre control module 206 may be configured to, if the temperature of the heat-generating element 207 is above the predetermined threshold even after opening of the louvre 201 and passage of the predetermined time period, generate an alert to user that the cooling capability of the airflow admitted by the open louvre 201 may be insufficient to cool the heat-generating element 207 at its current level of use (block 970).

Figure 10:
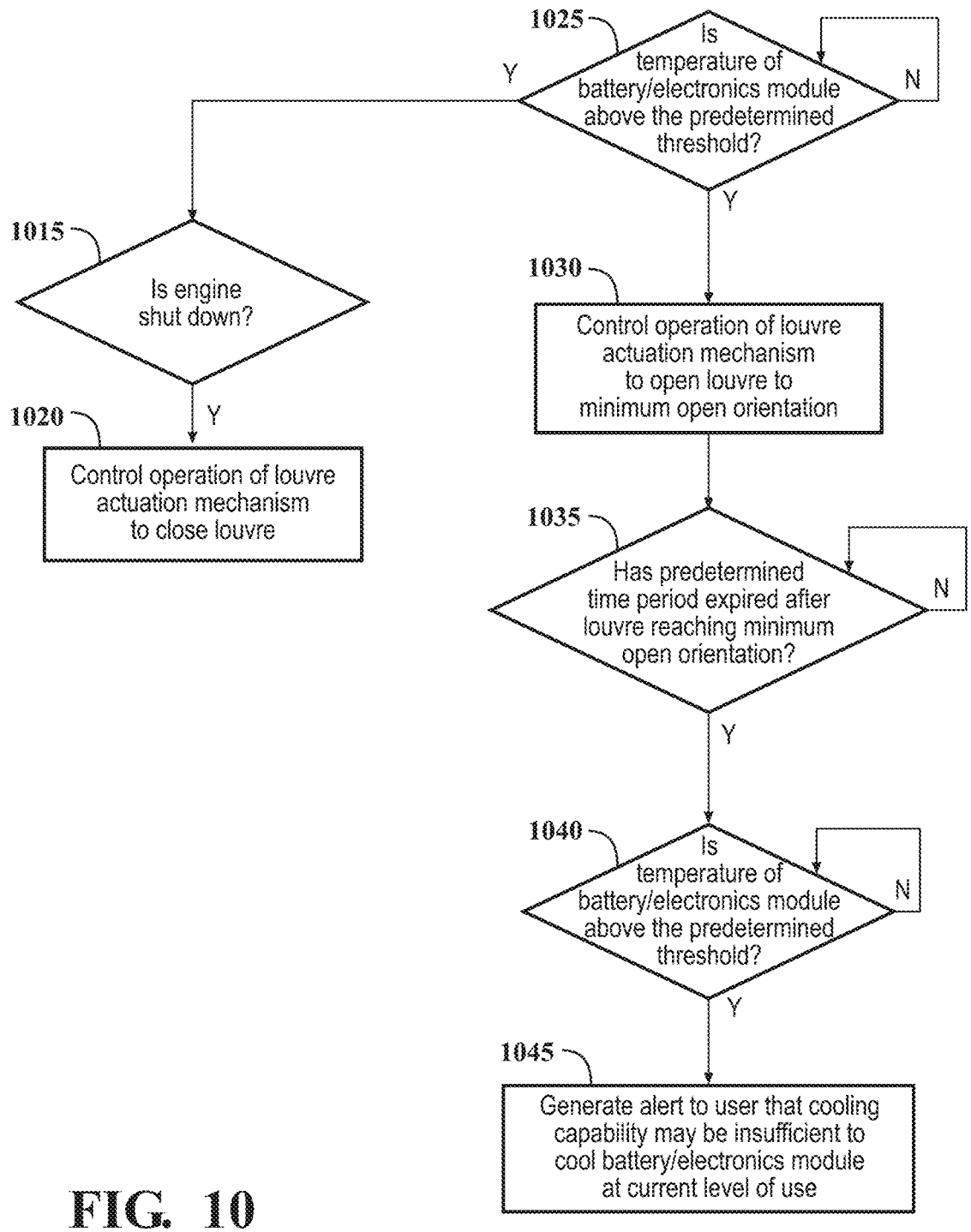
FIG. 10 is a flow diagram illustrating operation of louvre actuation mechanism in accordance with FIGS. 7A-7B mounted in the aircraft wing.

FIG. 10 is a flow diagram illustrating operation of an embodiment of a louvre control system such as shown in FIGS. 7A-7B, where the louvre actuation mechanism includes an SMM member for operating the louvre 201. The louvre control module 206 may be configured to (in block 1025) (constantly or intermittently) receive temperature data from the heat-generating element temperature sensor(s) 123 configured to measure the temperature of a heat-generating element aligned with the louvre 201 controlled by the louvre control module 206. The louvre control module 206 may continue to monitor the heat-generating element temperature until the temperature exceeds a predetermined threshold, indicating that the heat-generating element may be overheating. Also, while monitoring the temperature of the heat-generating element 207, the louvre control module 206 may (in block 1015) constantly monitor a status of the engine nacelle 100d to determine if the engine is shut down. If, at any time, the engine in the nacelle 100d shuts down, the louvre control module 206 may (in block 1020) control operation of louvre actuation mechanism 202 to close the louvre 201.

Returning to block 1025, if the temperature of the heat-generating element exceeds the predetermined threshold, the louvre control module 206 may (in block 1030) control operation of the louvre actuation mechanism 202B to rotate the louvre 201 to the minimum open orientation. This orientation of the louvre may provide the best average or compromise orientation of the louvre for all possible rotational orientations of the nacelle 100d and in view of the inherent control capabilities of the SMM-implemented louvre actuation mechanism 202B.

After the louvre 201 has reached the minimum open orientation angle, the louvre control module 206 may (in block 1035) determine when a predetermined time period has expired after the louvre 201 reaching the minimum open orientation. This allows a period of time for any cooling air admitted by the open louvre to cool the heat-generating element 207. If the temperature of the heat-generating element 207 is not above the predetermined threshold, the louvre control module 206 may continue to monitor the temperature. The louvre control module 206 may be configured to, if the temperature of the heat-generating element 207 is above the predetermined threshold even after opening of the louvre 201 and passage of the predetermined time period, generate an alert to user that the cooling capability of the airflow admitted by the open louvre 201 may be insufficient to cool the heat-generating element 207 at its current level of use (block 1045).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A louvre assembly comprising:
   a louvre operably connected to a wing and structured to be rotatable to control airflow through an air intake of the wing into an interior of the wing;
   a louvre actuation mechanism operably connected to the louvre and configured to control rotation of the louvre;
   a processor; and
   a memory communicably coupled to the processor and storing a louvre control module including computer-readable instructions that when executed by the processor cause the processor to autonomously control operation of the louvre actuation mechanism to:
   control rotation of the louvre responsive to a temperature of a heat-generating element mounted in the wing interior; and
   autonomously control operation of the louvre actuator mechanism to control rotation of the louvre responsive to an orientation of an engine nacelle operably connected to the wing.

2. The louvre assembly of claim 1 wherein the louvre control module includes computer-readable instructions that when executed by the processor cause the processor to autonomously control operation of the louvre actuation mechanism to control rotation of the louvre so that an orientation angle of the louvre matches a rotational orientation of the engine nacelle when the nacelle is in an intermediate orientation.

3. The louvre assembly of claim 1 wherein the louvre control module includes computer-readable instructions that when executed by the processor cause the processor to autonomously control operation of the louvre actuation mechanism to control rotation of the louvre to a minimum open orientation when the engine nacelle is in a lowered orientation.

4. The louvre assembly of claim 1 wherein the louvre control module includes computer-readable instructions that when executed by the processor cause the processor to autonomously control operation of the louvre actuation mechanism to control rotation of the louvre so that the louvre is in a maximum open orientation when the engine nacelle is in a raised orientation.

5. The louvre assembly of claim 1 wherein the louvre comprises:
   a base portion having a first surface, a second surface residing opposite the first surface and structured to face toward the interior of the wing, and a pair of opposed side edges connecting the first surface and the second surface;
   a ramp portion positioned along the base portion second surface, the ramp portion defining an airflow deflection surface extending from the base portion second surface in a direction away from the second surface toward a rear edge of the ramp portion, the ramp portion being spaced apart from each side edge of the pair of side edges so as to define a side airflow passage extending along the base portion second surface between a side of the ramp portion and each side edge of the base portion.

6. The louvre assembly of claim 5, wherein a rear edge of the ramp portion is curved and has a constant radius centered at a rotational axis of the louvre.

7. The louvre assembly of claim 5, wherein the airflow deflection surface is curved.

8. The louvre assembly of claim 5, wherein the air inlet is positioned to cover an air inlet located in a propeller wash zone of an engine nacelle mounted on the wing.

9. The louvre assembly of claim 5 wherein the louvre base portion first surface is structured to blend with an outer surface of a mounting base of the louvre assembly when the louvre is in a closed orientation.

10. The louvre assembly of claim 5 further comprising a mounting base including an air intake opening extending therethrough and structured to be mounted to the wing to cover an opening formed in the wing, and wherein the louvre is rotatably coupled to the mounting base over the air intake opening.

11. The louvre assembly of claim 10 wherein the mounting base is structured to be attachable to an upper surface of the wing.

12. The louvre assembly of claim 1 wherein the louvre actuator mechanism comprises a motor and at least one gear operably connecting the motor with the louvre, the at least one gear being structured to translate a rotation of an output shaft of the motor to a rotation of the louvre.

13. The louvre assembly of claim 1 wherein the louvre actuator mechanism comprises:
   a spring member operably connected to the louvre and structured to exert a force on the louvre biasing rotation of the louvre toward a closed orientation of the louvre; and
   a shape-memory material member operably connected to the louvre and structured to be energizable to rotate the louvre to an open orientation of the louvre against the biasing force exerted by the spring member.

14. A method for controlling rotation of a louvre operably connected to a wing and structured to cover an opening enabling fluid communication between an exterior of the wing and an interior of the wing, the method comprising a steps of:
   autonomously controlling rotation of the louvre responsive to a temperature of a heat-generating element mounted in the wing interior; and
   autonomously controlling rotation of the louvre responsive to an orientation of an engine nacelle operably connected to the wing.

15. The method of claim 14 further comprising a step of autonomously controlling rotation of the louvre so that an orientation angle of the louvre matches a rotational orientation of the engine nacelle when the nacelle is in an intermediate orientation.

16. The method of claim 14 further comprising a step of autonomously controlling rotation of the louvre to a minimum open orientation when the engine nacelle is in a lowered orientation.

17. The method of claim 14 further comprising a step of autonomously controlling rotation of the louvre so that the louvre is in a maximum open orientation when the engine nacelle is in a raised orientation.

18. A louvre assembly comprising:
   a louvre operably connected to a wing and structured to be rotatable to control airflow through an air intake of the wing into an interior of the wing;
   a louvre actuation mechanism operably connected to the louvre and configured to control rotation of the louvre;
   a processor; and
   a memory communicably coupled to the processor and storing a louvre control module including computer-readable instructions that when executed by the processor cause the processor to autonomously control operation of the louvre actuation mechanism to control rotation of the louvre responsive to an orientation of an engine nacelle operably connected to the wing.

* * * * *